US010643665B2

(12) United States Patent
de Jong et al.

(10) Patent No.: US 10,643,665 B2
(45) Date of Patent: May 5, 2020

(54) DATA PROCESSING SYSTEMS

(71) Applicant: TomTom International B.V., Amsterdam (NL)

(72) Inventors: Frank de Jong, London (GB); Eveline Anna Kleinjan, London (GB); Peter-Frans Pauwels, Amsterdam (NL); Slobodan Stanisic, Belgrade (RS); Douglas Hetherington, Christchurch (GB); Gavin Spence, Amsterdam (NL); Walter Hermsen, Baarn (NL); Davide Zilio, London (GB); Erno Marius Obogeanu-Hempel, Munich (DE); Nebojsa Obradovic, Belgrade (RS)

(73) Assignee: TOMTOM INTERNATIONAL B.V., Amsterdam (NL)

( * ) Notice: Subject to any disclaimer, the term of this patent is extended or adjusted under 35 U.S.C. 154(b) by 0 days.

(21) Appl. No.: 15/570,678

(22) PCT Filed: Apr. 29, 2016

(86) PCT No.: PCT/IB2016/000715
§ 371 (c)(1),
(2) Date: Oct. 30, 2017

(87) PCT Pub. No.: WO2016/174524
PCT Pub. Date: Nov. 3, 2016

(65) Prior Publication Data
US 2018/0190323 A1 Jul. 5, 2018

Related U.S. Application Data

(60) Provisional application No. 62/279,638, filed on Jan. 15, 2016, provisional application No. 62/154,697, filed on Apr. 29, 2015.

(51) Int. Cl.
*G11B 27/32* (2006.01)
*H04N 5/77* (2006.01)
(Continued)

(52) U.S. Cl.
CPC ............ *G11B 27/322* (2013.01); *G11B 19/20* (2013.01); *G11B 27/034* (2013.01); *G11B 27/10* (2013.01);
(Continued)

(58) Field of Classification Search
CPC ..... G11B 27/322; G11B 19/20; G11B 27/034; G11B 27/10; G11B 27/105; G11B 27/11; G11B 27/28; H04N 5/772
See application file for complete search history.

(56) References Cited

U.S. PATENT DOCUMENTS

2002/0044690 A1* 4/2002 Burgess .................. G06F 16/29
382/209
2002/0191087 A1* 12/2002 Hashimoto ........ H04N 1/00244
348/231.3
(Continued)

FOREIGN PATENT DOCUMENTS

| WO | 2011149825 | 12/2011 |
| WO | 2013001537 | 1/2013 |
| WO | 2013191727 | 12/2013 |

OTHER PUBLICATIONS

Atkins, H., Blast Motion Captures Movements, Metrics and Highlights Like You're a Pro Athlete, retrieved from the Internet at https://blastmotion.com/wp-content/uploads/2015/02/article-forbes-blast-motion-captures-movements.pdf (retreived on Feb. 13, 2018), Mar. 25, 2015.
(Continued)

*Primary Examiner* — Thai Q Tran
*Assistant Examiner* — Sunghyoun Park

(57) ABSTRACT

Methods and systems are disclosed related to the processing of video and sensor data recorded by a video camera. For example, a first embodiment is directed to the storage of sensor data in a metadata portion of a digital media file, a second embodiment is directed to the storage of highlight data in a metadata portion of a digital media file, and a third embodiment is directed to the creation of highlight data based on sensor data.

21 Claims, 17 Drawing Sheets

(51) Int. Cl.
G11B 27/10 (2006.01)
G11B 27/28 (2006.01)
G11B 27/034 (2006.01)
G11B 19/20 (2006.01)
G11B 27/11 (2006.01)

(52) U.S. Cl.
CPC ............ *G11B 27/105* (2013.01); *G11B 27/11* (2013.01); *G11B 27/28* (2013.01); *H04N 5/772* (2013.01)

(56) References Cited

U.S. PATENT DOCUMENTS

| | | | |
|---|---|---|---|
| 2004/0047615 A1* | 3/2004 | Itoh | G11B 27/105 386/328 |
| 2007/0203927 A1* | 8/2007 | Cave | G06F 17/301 |
| 2008/0288212 A1* | 11/2008 | Greifeneder | G06F 11/3466 702/182 |
| 2010/0111489 A1* | 5/2010 | Presler | H04N 5/225 386/278 |
| 2010/0169910 A1* | 7/2010 | Collins | G06Q 30/0251 725/14 |
| 2011/0264715 A1 | 10/2011 | Singer et al. | |
| 2013/0141590 A1* | 6/2013 | Matsumoto | H04N 5/33 348/164 |
| 2013/0156402 A1* | 6/2013 | Murakami | G11B 27/32 386/248 |
| 2013/0330054 A1 | 12/2013 | Lokshin | |
| 2014/0072284 A1 | 3/2014 | Avrahami et al. | |
| 2014/0168243 A1* | 6/2014 | Huang | G06T 1/20 345/522 |
| 2014/0275898 A1* | 9/2014 | Taub | A61B 5/14532 600/347 |
| 2015/0021444 A1* | 1/2015 | Goergen | G06F 3/0604 246/122 R |
| 2015/0078727 A1 | 3/2015 | Ross et al. | |
| 2015/0105881 A1* | 4/2015 | Guerrero | A63B 24/0062 700/91 |
| 2015/0278165 A1* | 10/2015 | Kim | G06F 17/212 715/252 |
| 2015/0313445 A1* | 11/2015 | Davidson | G06T 3/4038 600/109 |

OTHER PUBLICATIONS

Scoblete, G., 12 Action Cameras for Your Next Extreme Adventure, retrieved from the Internet at http://www.pdnonline.com/gear/12-Action-Cameras-For-Your-Next-Extreme-Adventure-12954.shtml (retrieved Sep. 8, 2016), Mar. 27, 2015.

International Search Report for International Application No. PCT/IB2016/000715 dated Nov. 11, 2016.

* cited by examiner

Manual Tagging
Mark interesting moments by placing a tag

On the camera

In the viewfinder in the mobile app

Sensor Extreme Highlights*
In addition to manual tags

Some examples:

altitude extreme    heart rate extreme    speed extreme

Example:
- 6 variables
- Highlight detected on speed "variable" at 52 sec

Score = mean ([ var1(@52s) / max(var1)
              var2(@52s) / max(var2)
              var3(@52s) / max(var3)
              var4(@52s) / max(var4)
              var5(@52s) / max(var5)
              var6(@52s) / max(var6)])

Peak values are normalized considering the entire duration

Sorting clusters

Start time 77.8 s　Finish Time 78.6 s　Duration 0.8 s　Score 44.9 %
Start time 69.2 s　Finish Time 74.4 s　Duration 5.2 s　Score 40.6 %
Start time 119.4 s　Finish Time 123.8 s　Duration 4.4 s　Score 38.3 %
Start time 129.0 s　Finish Time 132.0 s　Duration 3.0 s　Score 38.2 %
Start time 86.6 s　Finish Time 91.4 s　Duration 4.8 s　Score 36.4 %
Start time 110.0 s　Finish Time 113.0 s　Duration 3.0 s　Score 34.9 %
Start time 97.0 s　Finish Time 99.4 s　Duration 2.4 s　Score 34.2 %

UP FOR A SURPRISE?

Why not shake your phone to let us add a few highlights. Review the result and if you like it, share it right away.

ADD HIGHLIGHTS TO YOUR STORY

While you focus on the action, we'll keep track of the highlights in your footage. These short clips are based on sensor data or a press on the camera's highlight button.

Add your highlights to a Story, either by selecting several highlights from your library, or add one directly while playing back. Alternatively, you can go to the Create a Story section straightaway and start adding highlights from there.

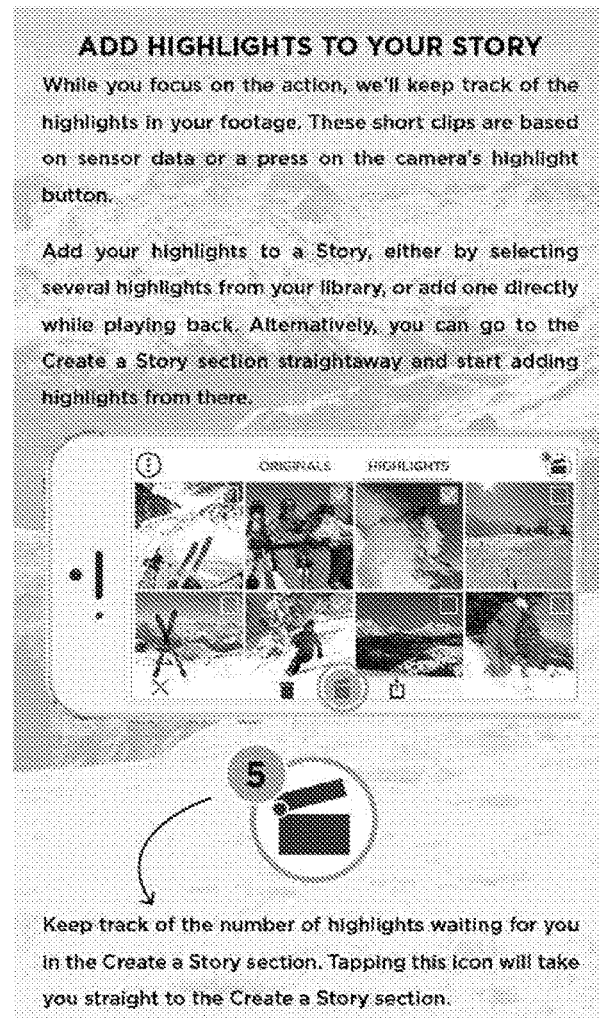

Keep track of the number of highlights waiting for you in the Create a Story section. Tapping this icon will take you straight to the Create a Story section.

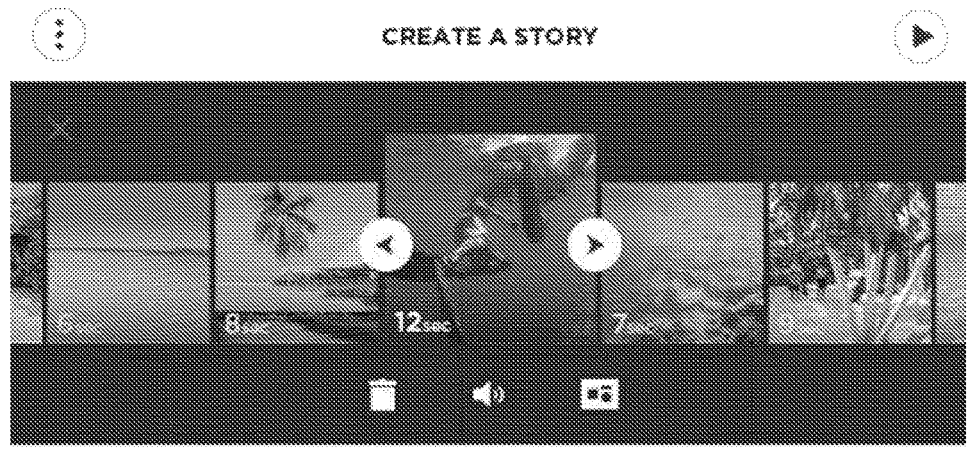
Figure 18C
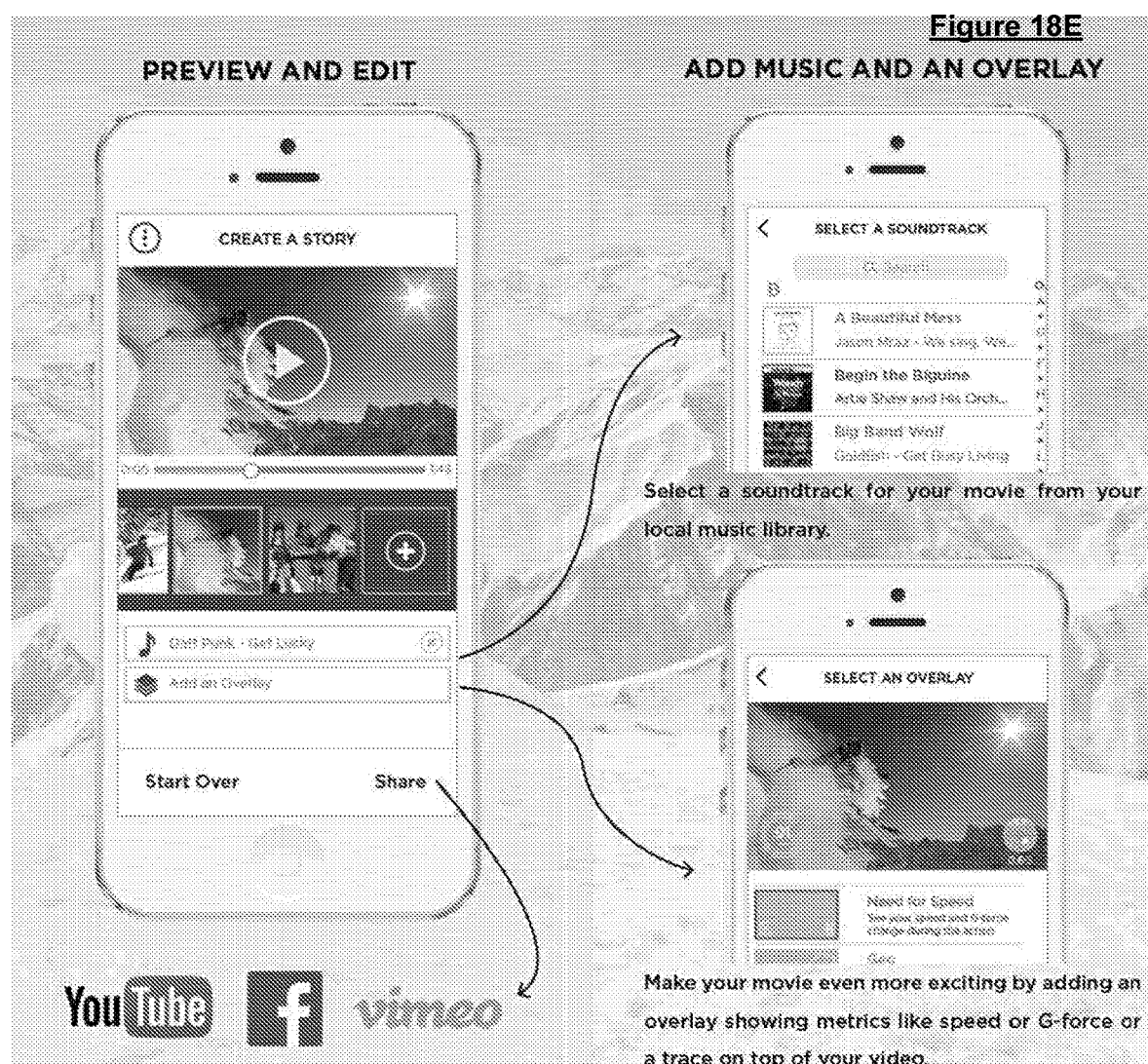
Figure 18D
Figure 18E
Figure 18F

DATA PROCESSING SYSTEMS

CROSS-REFERENCE TO RELATED APPLICATIONS

The present application is a National Stage of International Application No. PCT/IB2016/000715, filed on Apr. 29, 2016, and designating the United States, which claims benefit to U.S. Provisional Applications 62/154,697 filed on Apr. 29, 2015 and 62/279,638 filed on Jan. 15, 2016. The entire content of these applications is incorporated herein by reference.

FIELD OF THE INVENTION

The present invention relates to the processing of data, and in particular to the processing of video and sensor data recorded by a video camera.

BACKGROUND OF THE INVENTION

Digital video cameras and the processing of digital media data recorded by such cameras have become commonplace in recent years. The video data and often audio data recorded by such cameras are typically written to a digital media container, such as the AVI container format or MP4 container format. These container formats allow the video and audio data, and in many cases other data such as subtitles and still images, to be stored in a digital media file, but also allows the data to be live broadcasted, i.e. streamed over the Internet.

Digital media containers are used to identify and interleave different data types, and comprise a plurality of portions including a payload (or data) portion and one or more metadata portions. The payload (or data) portion includes the media data, typically with each of the data types, e.g. video, audio, etc, in the container being interleaved (or multiplexed). The one or more metadata portions contain data about the container and the media data (or content) contained therein. For example, the one or more metadata portions can include data such as: the number of streams (or tracks), e.g. video, audio, etc; the format of each stream, e.g. the type of compression, if any, used to encode each stream; and the duration of the media data; all of which are required to read the data in the container and to subsequently provide the content. The one or more metadata portions can also include information about the content in the container, such as a title, an artist name, etc. Digital media containers typically have a hierarchical structure, with the one or more metadata portions often being positioned at the start of the container. This is not always the case, however, and in some instances one or more metadata portions can be positioned at the start of the container, and one or more other metadata portions can be positioned at the end of the container.

In the case of the MP4 container, each of the portions of the container are typically referred to as 'atoms'. The payload portion of a MP4 container is called the mdat atom, and the metadata portions include the moov atom that acts as the index for the container and defies the timescale, duration, display characteristics of the media data in the container, and information for each track in the container, and often one or more uuid atoms, or so called user defined atoms. The moov atom is required to be accessed before it becomes possible to play the media content in a MP4 container, and the position of the moov atom is therefore typically dependent on the manner in which the container is going to be delivered, e.g. progressive download, streaming or local playback. For local playback, the position of the moov atom in the container is not important, since the entire file is available immediately. Accordingly, the moov atom will typically be found at the end of the container, as this can be beneficial since the data and thus size of the moov atom is not known until the media data has been added to the container. However, for progressive download or streaming, if the moov atom were to be positioned at the end of the container, then the entire file is required to be downloaded before it can be played (or a second communication channel, separate from a communication channel used to stream the media content of the file, is needed to obtained the moov atom). Accordingly, in such instances it is desirable for the moov atom to be positioned at the start of the container.

An overview of certain digital media processing techniques will now be described, with reference to FIGS. 1, 2 and 3.

A first technique is that of writing a digital media file, often generally called "encoding", and is shown in FIG. 1. Uncompressed (or raw) media data, also known as streams, and which can include video frames recorded by a video camera and audio packets recorded by a microphone, is obtained and encoded into a compressed format. Compression reduces the size of the data stream by removing redundant information, and can be lossless compression or lossy compression; lossless compression being where the reconstructed data is identical to the original, and lossy compression being where the reconstructed data is an approximation to the original, but not identical. For example, the video stream can be compressed using the H.264 compression format, and the audio stream can be compressed using the AAC compression format. Once the streams have been encoded, they are multiplexed, also referred to as "muxing", in which the streams are combined into a single stream. The multiplexed stream can then be written to the payload (or data) portion of a file, and after the recording has stopped the file is closed by updating and/or adding the relevant one or more metadata portions to the file. Alternatively, the multiplexed stream can be streamed over a network, rather than being written to a file.

A second technique is that of reading a digital media file, often generally called "decoding", and is shown in FIG. 2. This technique is essentially the reverse of the "encoding" shown in FIG. 1, and involves demultiplexing the streams that are contained in the file based on information in one or more metadata portions of the file. Each of the demultiplexed streams can then be decoded from their compressed format, again based on information in one or more metadata portions of the file, and the video frames, audio packets, etc can then be played.

A third technique is that of transcoding, and is shown in FIG. 3. Transcoding is the process of demultiplexing and decoding the streams in a digital media file, and then re-encoding and re-multiplexing some or all of the data in the streams to generate a new digital media file. Transcoding is typically performed to convert a file from one type to another type, or to change the compression formats used to encode the media data in the file, or to change format parameters of the media data, such as frame rate, resolution.

Digital video cameras that use such digital media processing techniques, either on the camera itself or on associated editing software for use on computing devices, such as desktop or laptop computers, smartphones and the like, are increasingly being used in outdoors and sports settings. Such video cameras, which are often referred to as "action cameras" are commonly attached to a user, sports equipment or a vehicle and are operated to capture video data, and typically also audio data, during a sports session with minimal user interaction.

It is also known to integrate a number of additional sensor devices into such action cameras. For example, WO 2011/047790 A1 discloses a video camera comprising some or all of an integrated GPS device, speed or acceleration measuring device, time measuring device, temperature measuring device, heart rate measuring device, barometric altitude measuring device and an electronic compass. These sensors can be integrated in the camera itself, or can be remote from the camera and operably connected to the camera using a wired or wireless connection. It is further described that the data from these additional sensor devices, i.e. sensor data, can be stored separately from the digital media file containing the recorded video and audio data, but also that the sensor data can be stored in the same digital media file as the recorded video and audio data, such as by storing the sensor data in the payload (or data) portion of the media file. In this latter case, the sensor data is multiplexed with the video and audio data, and can, for example, be stored in the subtitle track of the media file.

WO 2011/047790 further discloses that the sensor data can be added as a digital overlay over the video data when it is played and displayed on a display device, such that to the viewers can see, for example, the changing speed, acceleration, position, elevation, etc of the user or their equipment simultaneously with the video. It is also disclosed that such digital overlays can be integrated permanently into the video data through a transcoding process, such that the recorded video can then be uploaded to a video sharing site, such as YouTube®.

While such techniques are advantageous in their own right, the Applicants believe that there remains scope for improvements to techniques for processing video image data, and in particular to techniques for processing integrated video image and sensor data.

SUMMARY OF THE INVENTION

According to an aspect of the present invention, there is provided a method of storing data collected by a digital video camera having one or more sensor devices associated therewith, the method comprising:

receiving an first input to cause the camera to start recording;

opening a digital media container on a first memory based on receipt of the first input;

writing video image data based on data received from an image sensor of the camera to a payload portion of the digital media container;

storing sensor data based on data received from the one or more sensor devices in a second memory;

receiving a second input to cause the camera to stop recording;

adding the sensor data stored in the second memory to a metadata portion of the digital media container based on receipt of the second input; and closing the digital media container to create a digital media file stored in the first memory.

The present invention extends to a system, preferably a digital video camera, for carrying out a method in accordance with any of the aspects or embodiments of the invention herein described.

Thus, in accordance with another aspect of the invention, there is provided a system for storing data collected by a digital video camera having one or more sensor devices associated therewith, the system comprising:

means for receiving an first input to cause the camera to start recording;

means for opening a digital media container on a first memory based on receipt of the first input;

means for writing video image data based on data received from an image sensor of the camera to a payload portion of the digital media container;

means for storing sensor data based on data received from the one or more sensor devices in a second memory;

means for receiving a second input to cause the camera to stop recording;

means for adding the sensor data stored in the second memory to a metadata portion of the digital media container based on receipt of the second input; and means for closing the digital media container to create a digital media file stored in the first memory.

The present invention further extends to a digital media file created using the method described above. The media file therefore comprising: video image data indicative of data received from an image sensor of a digital video camera during a recording event, i.e. a period of time between receipt of input (or instruction) to start recording and an input (or instruction) to stop recording, in a payload portion of the media file; and sensor data indicative of data received from one or more sensor devices associated with the camera during the recording event in a metadata portion of the media file.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa.

The present invention is a computer implemented invention, and any of the steps described in relation to any of the aspects or embodiments of the invention may be carried out by a set of one or more processors that execute software comprising computer readable instructions stored on a non-transitory computer readable medium.

The present invention, at least in some aspects and embodiments, is concerned with methods and systems for storing data collected by a digital video camera having one or more sensor devices associated therewith. The one or more sensor devices, as will be discussed in more detail below, can include sensors integral with the camera, i.e. within the housing of the camera, but can also include sensors remote from the camera and which are operably connected to the camera using a wired or wireless connection.

In the present invention, video image data is stored in a payload portion of a media file, as is conventional in the art. However, in contrast with known methods, such as that described in WO 2011/047790 A1, the sensor data is stored in a metadata portion of the same media file, rather than in the payload portion of the media file. The Applicants have found that this allows the sensor data to be accessed and used more quickly and easily to provide other functionality, such as in the generation of highlights as will be described in more detail below, since the sensor data does not need to be demultiplexed from the other data, e.g. the video image data, audio data, etc, in the payload portion of the file before it can be used.

In accordance with the invention, a first input is received to cause the digital video camera to start recording. The first input can be a manual input by a user, such as the user actuating a user input, e.g. button, slide, etc, of the camera, or of a remote control device that is in communication with the camera using a wired or wireless connection. The manual input by the user could additionally or alternatively include a touch or gesture input, such as the selection of a virtual button presented on a touch sensitive display screen, and/or an audible input, such as a voice command by the user that is detected and interpreted by automatic speech recognition (ASR) software. The first input could also be an automatic input, such as a command to start recording after a predetermined period of time has elapsed and/or based on data from the one or more of the sensor devices. For example, the first input could be automatically generated when a predetermined speed or acceleration is detected, e.g. based on data output by a global navigation satellite system (GNSS) receiver, an accelerometer or the like.

A digital media container is opened on a first memory based on receipt of the first input. Any suitable digital media container can be used, such as MP4, AVI, etc. The first memory preferably comprises a non-volatile memory device for storing the data collected by the video camera, and may comprise a removable non-volatile memory device that can be is attachable to and detachable from the video camera. For example, the first memory may comprise a memory card such as, for example, an SD card or the like.

As will be appreciated, the video camera comprises an image sensor that generates raw, i.e. uncompressed, image data. While the camera can be used in any situation as desired, preferably the image data generated by the image sensor, and thus collected by the video camera, is preferably data collected during an outdoor or sports session or the like, preferably while the video camera is attached to a user, sports equipment or a vehicle. The video camera also comprises a video processing device, including at least an encoder, to process the raw image data and generate an encoded (video) stream. As will be described in more detail below, the video processing device preferably further includes a decoder to decode an encoded (video) stream, and which can preferably be used together with the at least one encoder to perform transcoding. The video processing device preferably comprises a system on chip (SOC) comprising cores (or blocks) for encoding, decoding and transcoding video and audio data. The video processing device is therefore preferably implemented in hardware, e.g. without using embedded processors.

The raw image data from the image sensor can be encoded using any suitable compression technique as desired, e.g. lossless compression or lossy compression, and could be, for example, an intraframe compression technique or an interframe compression technique. As known in the art, intraframe compression techniques function by compressing each frame of the image data individually, whereas interframe compression techniques function by compressing a plurality of neighbouring frames together (based on the recognition that a frame can be expressed in terms of one or more preceding and/or succeeding frames. However, in preferred embodiments, the raw image data is processed to generate at least one stream encoded using an interframe compression technique, such as H.264. The properties of the encoded (video) stream, such as the frame rate and resolution, can be selected by the user, e.g. by using a user interface of the camera and/or a remote control device. For example, the user can select to record video image data at one or more of the following resolutions: 720p; 1080p; 2.7K and 4K, and/or at one or more of the following frame rates: 15 frames per second (fps); 30 fps; and 60 fps; although it will be appreciated that such values are merely exemplary.

In preferred embodiments, the first memory is within a housing of the video camera, and is preferably is connected to the image sensor and video processing device of the camera using a wired connection. It is also contemplated, however, that the first memory could be remote from the video camera, and be connected to the image sensor and video processing device of the camera using a wireless connection.

In the present invention, video image data based on data received from the image sensor of the camera, preferably the encoded stream output by the video processing device, e.g. an H.264 encoded stream, is written to the payload portion of the digital media container opened on the first memory. As known in the art, the digital media container can comprise a plurality of tracks, such as one or more video tracks, one or more audio tracks, one or more subtitle tracks, etc; the data in each of these tracks being multiplexed, i.e. placed into packets and interleaved, and stored in the payload portion of the container. Accordingly, in preferred embodiments, the video image data is interleaved with other data, such as audio data, other video image data, etc, as will be discussed in more detail below, and written to the payload portion of the digital media container. The digital video camera therefore preferably comprises a multiplexer to interleave a plurality of encoded media streams, e.g. one or more video streams, one or more audio streams, etc, into a single interleaved encoded stream, together with a demultiplexer to separate the single interleaved encoded stream back into its constitute plurality of encoded media streams.

In preferred embodiments, the video camera further comprises a microphone that generates raw, i.e. uncompressed, audio data, and an audio processing system, including at least an encoder, to process the raw audio data and generate an encoded (audio stream). The raw audio data can be encoded using any suitable compression technique as desired, e.g. lossless compression or lossy compression. For example, in preferred embodiments, the raw audio data is processed to generate a stream encoded using the AAC compression technique. The microphone can be within the housing of the video camera, and the housing comprises an opening to the external environment. In other embodiments, an external (or remote) microphone can be used, which is connected to the camera using a wired or wireless connection. In preferred embodiments, the audio data, e.g. the encoded stream output by the audio processing system, e.g. an AAC encoded stream, is written to the payload portion of the digital media container opened on the first memory, preferably with the audio data being multiplexed with the video image data.

Additionally, or alternatively, the video processing device can comprise a first encoder to generate a first encoded stream from data received from the image sensor of the camera, preferably using an interframe compression technique, and a second encoder to generate a second encoded stream from data received from the image sensor of the camera, preferably using an intraframe compression technique. The first encoded stream can comprise an H. 264 encoded stream, and, as discussed above, may be at one or more of the following resolutions: 720p; 1080p; 2.7K and 4K, and/or at one or more of the following frame rates: 15 fps; 30 fps; and 60 fps. The second encoded stream, which will typically be a lower quality stream than the first encoded stream, e.g. a stream with a lower resolution and/or frame rate, can comprise a stream wherein each frame is compressed as a jpeg image. Each jpeg image can be at a resolution of 768×432 pixels (px), and the stream may have a frame rate of 30 fps; although it will be appreciated that the values are merely exemplary. In preferred embodiments, both the first and second encoded streams are written to the payload portion of the digital media container opened on the first memory, preferably with the first encoded stream being multiplexed with the second encoded stream.

The presence of both encoded streams in the media file (created when the container is closed) is advantageous in that the first encoded video stream can be used in a normal manner to provide a high quality video, whereas the second encoded video stream can be streamed to as remote device, such as a smartphone or other mobile computing device, such that a user can immediately view the recorded video in the media file (or preview a video before finalising edits to a video to be created from the first encoded video stream). The use of an intraframe compression technique with the second encoded stream, in contrast to the use of a more complex interframe compression technique, allows the video to be played, in practice, by any smartphone or other mobile computing device without the need for specific software and hardware.

It is believed that the storage of first video stream encoded using an interframe compression technique and a second video stream encoded using an intraframe compression technique is new and advantageous in its own right.

Thus, in accordance with another aspect of the present invention, there is provided a method of storing data collected by a digital video camera having an image sensor and a video processing device, the method comprising:

receiving an first input to cause the camera to start recording;

opening a digital media container on a memory based on receipt of the first input;

using a first encoder of the video processing device to generate a first encoded video stream from data received from the image sensor using an interframe compression technique;

using a second encoder of the video processing device to generate a second encoded video stream from the data received from the image sensor using an intraframe compression technique;

writing the first and second encoded video streams to a payload portion of the digital media container;

receiving a second input to cause the camera to stop recording; and closing the digital media container to create a digital media file stored in the memory based on receipt of the second input.

The present invention extends to a system, preferably a digital video camera, for carrying out a method in accordance with any of the aspects or embodiments of the invention herein described.

Thus, in accordance with another aspect of the invention, there is provided a system for storing data collected by a digital video camera having an image sensor and a video processing device, the system comprising:

means for receiving an first input to cause the camera to start recording;

means for opening a digital media container on a memory based on receipt of the first input;

means for using a first encoder of the video processing device to generate a first encoded video stream from data received from the image sensor using an interframe compression technique;

means for using a second encoder of the video processing device to generate a second encoded video stream from the data received from the image sensor using an intraframe compression technique;

means for writing the first and second encoded video streams to a payload portion of the digital media container;

means for receiving a second input to cause the camera to stop recording; and means for closing the digital media container to create a digital media file stored in the memory based on receipt of the second input.

The present invention further extends to a digital media file created using the method described above. The media file therefore comprising two sets of video image data indicative of data received from an image sensor of a digital video camera during a recording event, i.e. a period of time between receipt of input (or instruction) to start recording and an input (or instruction) to stop recording; a first set of video image data being encoded using an interframe compression technique, and a second set of video image data being encoded using an intraframe compression technique. These two sets of video image data are preferably multiplexed and stored in a payload portion of the media file.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa.

The first and second encoders can be formed as separate devices. However, in preferred embodiments, the video processing device comprises two output channels; one for the first encoded stream, and the other for the second encoded stream.

As discussed above, both the first and second encoded streams are preferably written to the payload portion of the digital media container opened on the first memory, preferably with the first encoded stream being multiplexed with the second encoded stream. The first encoded stream is preferably written to a video track of the payload portion of the container, and data is preferably added to a metadata portion of the resultant file, such that the first encoded stream is identified as video image data. This allows the first encoded stream to be played (after being demultiplexed and decoded) by conventional video playing and editing hardware and/or software of a computing device. The second encoded stream, despite also being video image data, is preferably written to a non-video track of the payload portion of the container, such as a text track, e.g. the subtitle track. As the second encoded stream is written to a non-video track, e.g. the subtitle track, and data is preferably not added to a metadata portion of the resultant file, such that the second encoded stream is not identified as video image data. This means that the second encoded stream will not be identifiable, and thus playable, by conventional video playing and editing hardware and/or software of a computing device.

Accordingly, in preferred embodiments, the method includes adding data to a metadata portion of the digital media container based on receipt of the second input (to cause the camera to stop recording) to identify only the first encoded video stream, and thus not the second encoded video stream, as video image data.

It is believed that the storage of a first video stream in a video track of a digital media container and a second video stream in a text track of the digital media container is new and advantageous in its own right.

Thus, in accordance with another aspect of the present invention, there is provided a method of storing data collected by a digital video camera having an image sensor and a video processing device, the method comprising:

receiving an first input to cause the camera to start recording;

opening a digital media container on a memory based on receipt of the first input, the digital media container comprising at least a video track and a text track;

using the video processing device to generate a first encoded video stream and a second encoded video stream from data received from the image sensor;

writing the first encoded video stream to the video track of the digital media container and writing the second encoded video stream to the text track of the digital media container;

receiving a second input to cause the camera to stop recording; and closing the digital media container to create a digital media file stored in the memory based on receipt of the second input.

The present invention extends to a system, preferably a digital video camera, for carrying out a method in accordance with any of the aspects or embodiments of the invention herein described.

Thus, in accordance with another aspect of the invention, there is provided a system for storing data collected by a digital video camera having an image sensor and a video processing device, the system comprising:

means for receiving an first input to cause the camera to start recording;

means for opening a digital media container on a memory based on receipt of the first input, the digital media container comprising at least a video track and a text track;

means for using the video processing device to generate a first encoded video stream and a second encoded video stream from data received from the image sensor;

means for writing the first encoded video stream to the video track of the digital media container and writing the second encoded video stream to the text track of the digital media container;

means for receiving a second input to cause the camera to stop recording; and means for closing the digital media container to create a digital media file stored in the memory based on receipt of the second input.

The present invention further extends to a digital media file created using the method described above. The media file therefore comprising two sets of video image data indicative of data received from an image sensor of a digital video camera during a recording event, i.e. a period of time between receipt of input (or instruction) to start recording and an input (or instruction) to stop recording. One of the sets of video image data is stored in a video track of the media file, and the other set of video image data is stored in a text track of the media file, such as a subtitle track.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. Furthermore, the first encoded video stream that is written to the video track of the container is preferably encoded using an interframe compression technique, and the second encoded video stream that is written to the text track of the container is preferably encoded using an intraframe compression technique. The first and second encoded video stream are also preferably multiplexed and stored in a payload portion of the media file.

As discussed above, in some aspects and embodiments of the present invention, data is received from one or more sensor devices associated with the camera, and this data, or data derived therefrom, is stored in a second memory. The second memory is preferably different from the first memory. For example, where the first memory is preferably a removable memory, such as an SD card, the second memory is preferably a non-removable memory within the camera. As will be appreciated, the sensor data is preferably contemporaneous with the video image data, and optionally audio data, collected by the video camera, and is preferably data collected during an outdoor or sports session or the like, preferably while the video camera is attached to a user, sports equipment or a vehicle. The sensor data therefore preferably comprises data collected substantially continually or at, preferably regular, intervals during the time in which video image data is recorded.

The one or more sensor devices are preferably used to measure at least one of: movements or other physical parameters of the user, camera, item of sports equipment and/or vehicle, such as position, speed, acceleration, etc (e.g. during the outdoor or sports session while video image data is being recorded); environmental conditions around the user and/or camera, such as temperature, pressure, etc; and physiological properties of the user, such as heart rate, VO2 max, etc. Accordingly, in embodiments, the sensor data may relate to parameters such as any one or more of: position; speed; acceleration; altitude; cadence; heart rate; temperature; bearing (or heading); light level; pressure; and orientation. Moreover, in embodiments, the one or more sensor devices preferably include one or more of: a positioning determining device, such as a global navigation satellite system (GNSS) receiver; an accelerometer (preferably a 3-axis accelerometer); a gyroscope; a magnetometer; a pressure sensor, i.e. a barometer; a temperature sensor, i.e. thermometer; an audio measurement device, such as a microphone; an electronic compass; a light sensor; and a heart rate monitor. One or some or all of the sensor devices can be located within a housing of the camera, and preferably operably coupled to a processor of the camera using a wired connection. Additionally, or alternatively, one or some or all of the sensor devices can be remote from the camera, e.g. configured to be worn by or attached to the user of the video camera and/or to sports equipment or a vehicle being used by the user. Such remote sensor devices are preferably operably coupled to a processor of the camera using a wireless connection, such as WiFi, Bluetooth, etc.

In embodiments, each of the one or more sensor devices has an associated sample rate that dictates the frequency at which data is received from the sensor device. The sample rate can be the same between all of the sensor devices, although typically at least some of the sensor devices will have different sample rates. The data received from the one or more sensor devices is preferably stored in the second memory in association with data indicative of the time at which the data was determined by the sensor device, e.g. a time stamp. The received data from the one or more sensor devices is preferably stored in the second memory according to a data structure comprising: a time stamp; a sensor device type; and a payload including the received sample from the sensor device.

In embodiments, the sensor data stored in the second memory can include one or more datasets in respect of a variable obtained directly from the one or more sensor devices, and/or one or more datasets in respect of a variable obtained indirectly from the one or more sensor devices, i.e. a variable derived from data obtained from the one or more sensor devices. For example, acceleration can be determined from speed as determined from a GNSS receiver.

In accordance with the invention, a second input is received to cause the digital video camera to stop recording. The second input can be a manual input by a user, such as the user actuating a user input, e.g. button, slide, etc, of the camera, or of a remote control device that is in communication with the camera using a wired or wireless connection. The user input to stop recording can be the same user input actuated to start recording, although in preferred embodiments the two user inputs are different. The manual input by the user could additionally or alternatively include a touch or gesture input, such as the selection of a virtual button presented on a touch sensitive display screen, and/or an audible input, such as a voice command by the user that is detected and interpreted by automatic speech recognition (ASR) software. The second input could also be an automatic input, such as a command to stop recording after a predetermined period of time has elapsed and/or based on data from the one or more of the sensor devices.

Based on the receipt of this second input, the sensor data stored in the second memory is added to a metadata portion of the digital media container, and the container then closed to create a digital media file stored in the first memory.

As will be appreciated, the sensor data will typically only form part of the total metadata that is added to the container in order to close the file. For example, the one or more metadata portions will also include data identifying the duration of the file, the type of compression used to encode the video and audio data, the number of media tracks in the file, the resolution of the video data, the frame rate of the video data, etc, and which are required to allow the file to be played, e.g. displayed, by a media player of a computing device. In addition, and as will be discussed in more detail below, the one or more metadata portions may also include data identifying one or more times (or moments) in the recorded video image data which have been determined to potentially be of interest to the user, referred to herein as "tags" or "highlights", and which can be used to facilitate playback and/or editing of the video image data.

The one or more metadata portions may also include data linking multiple media files, e.g. identifying that a particular media file contains video data that immediately precedes or succeeds another media file. For example, preferably there is a predetermined maximum size of a media file, which will often correspond to a particular recording duration using a particular video format. Therefore, in embodiments, when this maximum size (or recording duration) is reached, then media container currently opened is closed by adding the relevant one or more metadata portions, and a new media container is opened. The one or more metadata portions therefore preferably include an association and order between the plurality of files, such that a user can view and edit the entire recorded image as though from a single media file (without the user having to manually select all of the media files that make up the sequence of media files). In other words, the one or more metadata portions of a media file preferably include information that identifies that particular media file's relationship to the other media file(s) in the sequence, i.e. that indicates the position of the media file in a sequence of related media files.

In embodiments of the invention, the one or more metadata portions of the media file are located before, i.e. in front of, the payload portion of the media file. As discussed above, by structuring the media file in this manner, then it allows the media data in the file to be streamed for playing and display on a remote computing device using a single communication channel (without needing to first transfer (or download) the entire media file to the remote computing device). According, in preferred embodiments, when opening the digital media container on the first memory, a predetermined amount of memory is reserved before the payload portion of the container into which the one or more metadata portions of the container are added when closing the container to create the media file. The amount of space in memory that is reserved can be the same for all containers that are opened, e.g. based on knowledge of a predetermine maximum size of the file. However, in other embodiments, the amount of space to be reserved can vary between contains based, for example, on the format, e.g. resolution, frame rate, etc, of the video image data to be written to the file.

In some aspects and embodiments of the invention, highlight data identifying one or more times of interest in the video image data is stored in a memory, such as the second memory mentioned above and that is used to store the sensor data, and the stored highlight data is then added to a metadata portion of the digital media container, e.g. opened on the first memory, based on a receipt of an input to cause the camera to stop recording, i.e. the second input. The digital media container is then closed to create a digital media file stored in the first memory. Accordingly, since the highlight data is stored in a metadata portion of the media file, then the data can be easily read and accessed, without needing to read the payload portion of the file, which allows the highlight data to be used to facilitate playback and/or editing of the video image data as will be discussed in more detail below.

It is believed that the storage of highlight data in a metadata portion of a media file comprising video image data in its payload portion, said highlight data identifying one or more times of interest in the video image data, is new and advantageous in its own right.

Thus, in accordance with another aspect of the present invention, there is provided a method of storing data identifying one or more times of interest in video image data collected by a digital video camera, the method comprising:

receiving an first input to cause the camera to start recording;

opening a digital media container on a first memory based on receipt of the first input;

writing video image data based on data received from an image sensor of the camera to a payload portion of the digital media container;

storing highlight data identifying one or more times of interest in the video image data in a second memory;

adding the highlight data stored in the second memory to a metadata portion of the digital media container based on receipt of a second input to cause the camera to stop recording; and closing the digital media container to create a digital media file stored in the first memory.

The present invention extends to a system, preferably a digital video camera, for carrying out a method in accordance with any of the aspects or embodiments of the invention herein described.

Thus, in accordance with another aspect of the invention, there is provided a system for storing data identifying one or more times of interest in video image data collected by a digital video camera, the method comprising:

means for receiving an first input to cause the camera to start recording;

means for opening a digital media container on a first memory based on receipt of the first input;

means for writing video image data based on data received from an image sensor of the camera to a payload portion of the digital media container;

means for storing highlight data identifying one or more times of interest in the video image data in a second memory;

means for adding the highlight data stored in the second memory to a metadata portion of the digital media container based on receipt of a second input to cause the camera to stop recording; and means for closing the digital media container to create a digital media file stored in the first memory.

The present invention further extends to a digital media file created using the method described above. The media file therefore comprising: video image data indicative of data received from an image sensor of a digital video camera during a recording event, i.e. a period of time between receipt of input (or instruction) to start recording and an input (or instruction) to stop recording, in a payload portion of the media file; and highlight data identifying one or more times of interest, e.g. to a user, in the video image data recorded during the recording event in a metadata portion of the media file.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, the first memory preferably comprises a non-volatile memory device for storing the data collected by the video camera, and may comprise a removable non-volatile memory device that can be is attachable to and detachable from the video camera, e.g. a memory card such as, for example, an SD card or the like. The second memory is preferably different from the first memory. For example, where the first memory is preferably a removable memory, such as an SD card, the second memory is preferably a non-removable memory within the camera.

The highlight data identifies one or more times of interest in the video image data, e.g. for use by the user when editing the video image data. The highlight data can comprise one or more single times in the video image data and/or or can comprise one or more time periods in the video image data. For the sake of clarity, each single time is referred to herein as a "tag", whereas each time period is referred to herein as a "highlight".

In embodiments, a highlight can be based on, and preferably includes, a tag. For example, the time period of a highlight can comprise a time window based on the time of the tag. The position and/or length of the time window of the highlight relative to the time of the tag can be the same for all highlights, or can be different for at least some of the highlights, e.g. dependent on the manner in which the tag was created, can be adjusted by the user, etc (as will be discussed in more detail below). Accordingly, a highlight, and preferably each highlight, preferably comprises a "tag time", i.e. a time of tag, and a time window, which can be defined as start time and an end time. Typically, the tag time will be between the start and end times of the time window. Although, it is also contemplated, in some embodiments, that the tag time can be the same as the start time or the same as the end time, or the tag time can be before the start time or after the end time. Each time can be defined as an absolute time, e.g. as a UTC (Coordinated Universal Time) value or using the time zone of the country or region in which the video image data in the media file was recorded. Preferably, however, each time is defined as a relative time, e.g. as an offset relative to the beginning and/or end of the video image data. As will be appreciated, a "highlight" with at least a tag time, but without information defining start and end times of a time window, will constitute a "tag".

A highlight, and preferably each highlight, comprises one or more of the following information: (i) an unique identifier (which can be unique for the just media file in the memory of the camera, for all media files in the memory of the camera, or for all media files in the memory of all cameras); (ii) a type identifying the type of tag or highlight, e.g. whether the tag was generated automatically or based on a manual input; (iii) a tag time identifying the time when the tag was generated, e.g. as an offset from the beginning of the video image data; (iv) a start time identifying the start of the highlight, e.g. as an offset from the beginning of the video image data; (v) an end time identifying the end of the highlight, e.g. as an offset from the beginning of the video image data; and (vi) additional information, which can be based on the type of tag or highlight, e.g. name of a user, a location of the tag, information from a sensor device at the tag time, etc. As will be appreciated, the additional information can form metadata for the highlight.

In embodiments, each highlight preferably has the same size (or length) in memory. This allows the highlights stored in a media file to be accessed, read, edited, etc more easily, especially when the media file is stored on a memory card, such as a SD card, having limited read and write speeds. Accordingly, and since it is desirable to have the one or more metadata portions of a media file located before the payload portion as discussed above, in some embodiments there is a predetermined maximum number of highlights that can be stored with a media file.

The one or more times of interest in the video image data can be determined based on received data indicative of a manual input, i.e. a user input. For example, a time of interest can be identified based on a user actuating a user input, e.g. button, slide, etc, of the camera, or of a remote device that is in communication with the camera using a wired or wireless connection. The manual input by the user could additionally or alternatively include a touch or gesture input, such as the selection of a virtual button presented on a touch sensitive display screen, and/or an audible input, such as a voice command by the user that is detected and interpreted by automatic speech recognition (ASR) software.

The use of a remote device, i.e. separate from the camera, to generate data indicative of a manual input allows someone watching a person performing an activity and is carrying or is associated with the camera, to identify one or more times of interest in the video image data being recorded. This can be advantageous since it frees the person perming the activity from needing to provide their own manual inputs, whilst still maintaining the ability to generate and store highlight data. The remote device may comprise a display device arranged to display, preferably substantially in real-time, the video image data being recorded by the camera; the video image data being streamed over a wireless connection from the camera to the remote device.

Similarly, in embodiments, data indicative of a manual input can be determined or received from multiple devices and/or multiple users. For example, a first user, who may be performing an activity and is carrying or is associated with the camera, can actuate a user input on the camera or a remote device, such as one worn on the user's wrist, while one or more second users, who may be watching the first user performing the activity, can actuate a user input on their own remote control devices (and that are in wireless communication with the camera). As will be appreciated, data indicative of such manual inputs will be received during the recording of the video image data.

Additionally, or alternatively, the one or more times of interest in the video image data can be automatically determined, i.e. not based on a manual input. For example, a time of interest can be identified based on an analysis of the sensor data received from the one or more sensor devices associated with the video camera. The sensor data can be used in this manner, since it is likely that a user will be interested in times of "extreme" events during the performance of an outdoor activity or sports session, e.g. so that they can quickly find and play these moments and/or share the moment with others. A time of interest may also, or alternatively, be determined based on an analysis of the recorded video image data and/or audio data. For example, the recorded video image data can be analysed using a facial recognition algorithm to identify times in the video image data when a person's face, or a particular person's face, can be seen. Similarly, the recorded audio data can be analysed, for example, to identify times when a particular sound is heard or a particular word or phrase is spoken. In other examples, one or more times of interest can be determined based on data received over a wireless connection from at least one wireless beacons or sensors. For example, a wireless beacon or sensor could detect when a user, who is performing an activity and is carrying or is associated with camera, is within a predetermined distance of the beacon, and, in response to detecting the user, transmit data, e.g. the time at which the user was detected, to the video camera. This would allow, for example, a user to place a wireless beacon on a finish line or at a certain location on a course being followed, e.g. a jump or other obstacle, and for the camera to create a tag and/or highlight based on the time at which the user is detected by the wireless beacon.

The analysis of the sensor data to identify the one or more times of interest can occur, e.g. substantially continuously or at periodic intervals, during the recording of the video image data, i.e. after receipt of the first input to cause the camera to start recording and before receipt of the second input to cause the camera to stop recording. Preferably, however, the analysis is performed after receipt of the input to stop recording, such that the sensor data recorded during the entire recording event, e.g. for the entire performance of the activity or sports session, can be analysed and compared. This allows for the most extreme events during the recording event itself to be identified, rather than just general extreme events. This is because, as will be appreciated, an extreme event experienced while cycling, for example, will typically appear very differently in the sensor data than an extreme event experienced while undertaking a motorsport; yet ideally both extreme events would want to be identified.

Accordingly, in embodiments, the sensor data stored in the second memory is analysed using a highlight identification algorithm, after receipt of the second input to cause the camera to stop recording, to generate highlight data identifying one or more times of interest in the video image data, and the sensor data and the highlight data is then added to a metadata portion of the digital media container so as to create the media file. As will be appreciated, there may already be highlight data stored in the second memory, e.g. determined from one or more manual inputs, before receipt of the input to stop recording, and in such embodiments the highlight data added to the metadata portion of the digital media container comprises first highlight data identifying one or more times of interest determined based on received manual inputs, i.e. referred to herein as "manual highlights", and second highlight data identifying one or more times of interest based on an analysis of the sensor data, i.e. referred to herein as "automatic highlights".

The highlight identification algorithm preferably comprises analysing a plurality of datasets obtained from the plurality of sensor devices associated with the video camera. Each of the datasets comprises a plurality of data values for a plurality of times during a time period in which video image data is collected, i.e. a recording event between an input causing the camera to start recording and an input causing the camera to stop recording. The datasets are analysed by identifying extrema, e.g. maxima and/or minima, in each of the datasets, and determining, for each of the identified extrema, if the time of an extremum is within a first predetermined time of the time of another of the extrema. The first predetermined time can be, for example, between 1 and 5 seconds, such as 3 seconds. A plurality of clusters are generated based on the determination, wherein each cluster comprises a plurality of extrema, and wherein the time of each extremum in the cluster is within the first predetermined time of the time of another extremum in the cluster. Each cluster, as will be appreciated, has a start time and an end time, which together define a duration for the cluster. The start time for the cluster corresponds to the earliest of the times of the extrema in the cluster, while the end time corresponds to the latest of the times of the extrema in the cluster. One or more of the generated clusters are then used to create highlights for the video image data, with each highlight typically being based on one of the clusters. It is contemplated, however, that if two or more clusters are close to each other in time, e.g. within a second predetermined time, then the clusters can be combined to create a single cluster, such that a highlight would be based on the two or more clusters that are combined. The second predetermined time can be, for example, between 1 and 5 seconds, such as 2 seconds.

It is believed that the analysis of sensor data collected while recording video image data to identify one or more times of interest in the video image data is new and advantageous in its own right.

Thus, in accordance with another aspect of the present invention, there is provided a method of identifying one or more times of interest in video image data collected by a digital video camera during a time period, said digital video camera having a plurality of sensor devices associated therewith, the method comprising:

identifying extrema in each of a plurality of datasets obtained from the plurality of sensor devices, each dataset comprising a plurality of data values for a plurality of times during the time period;

determining, for each of the identified extrema, if the time of an extremum is within a predetermined time of the time of another of the extrema;

generating a plurality of clusters based on the determination, each cluster comprising a plurality of extrema, wherein the time of each extremum in the cluster is within the predetermined time of the time of another extremum in the cluster;

using at least one of the clusters to create highlight data identifying one or more times of interest in the video image data, said highlight data comprising at least one highlight having a time window based on the earliest and latest of the times of the extrema in the cluster used to create the highlight; and storing the highlight data in association with a digital media file comprising the video image data.

The present invention extends to a system, preferably a digital video camera, for carrying out a method in accordance with any of the aspects or embodiments of the invention herein described.

Thus, in accordance with another aspect of the invention, there is provided a system for identifying one or more times of interest in video image data collected by a digital video camera during a time period, said digital video camera having a plurality of sensor devices associated therewith, the system comprising:

means for identifying extrema in each of a plurality of datasets obtained from the plurality of sensor devices, each dataset comprising a plurality of data values for a plurality of times during the time period;

means for determining, for each of the identified extrema, if the time of an extremum is within a predetermined time of the time of another of the extrema;

means for generating a plurality of clusters based on the determination, each cluster comprising a plurality of extrema, wherein the time of each extremum in the cluster is within the predetermined time of the time of another extremum in the cluster;

means for using at least one of the clusters to create highlight data identifying one or more times of interest in the video image data, said highlight data comprising at least one highlight having a time window based on the earliest and latest of the times of the extrema in the cluster used to create the highlight; and means for storing the highlight data in association with a digital media file comprising the video image data.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, the method is preferably performed on the digital video camera, and is preferably performed on the sensor data stored in the second memory, e.g. after receipt of the input to cause the camera to stop recording and before it is added to a metadata portion of the resultant media file comprising the video image data. It is contemplated, however, that the method can be performed on a computing device, separate from the video camera, using the sensor data stored in the media file.

The plurality of datasets that are analysed can include one or more datasets in respect of a variable obtained from a single sensor device, such as speed as determined from a global navigation satellite system (GNSS) receiver, heart rate as determined from a heart rate sensor, etc. Additionally, or alternatively, the plurality of datasets that are analysed can include one or more datasets in respect of a variable from a plurality of sensor devices, such as absolute or relative altitude as determined from a pressure sensor and a temperature sensor, acceleration as determined from an accelerometer, gyroscope and compass, etc.

The plurality of datasets that are analysed can include one or more datasets in respect of a variable obtained directly from the one or more sensor devices, e.g. and as will typically be stored in the second memory of the camera. Additionally, or alternatively, the plurality of datasets that are analysed can include one or more datasets in respect of a variable obtained indirectly from the one or more sensor devices, e.g. acceleration can be determined from speed as determined from a GNSS receiver. Such variables can be determined upon receipt of the data from the associated one or more sensor devices, and stored as the sensor data in the second memory. Alternatively, such variables can be determined when the sensor data is accessed from the second memory for use by the highlight identification algorithm.

In aspects and embodiments of the invention, extrema are identified in each of the plurality of datasets. The extrema can include maxima (e.g. peaks) and/or minima (e.g. troughs), e.g. based on the particular variable of the dataset being analysed. In embodiments, the datasets can be filtered, e.g. using a Kalman filter, and/or smoothed, e.g. using a moving average or similar technique. Such filtering and/or smoothing removes noise and other phenomena from the datasets, and can make the facilitate the process of identifying the extrema. In embodiments, extrema are identified only when the extrema passes a certain threshold, i.e. is above or below a predetermined value as appropriate. The threshold value may, and typically will be, dependent on the particular variable of the dataset being analysed. The threshold value may also be dynamically determined based on the data in the dataset. In other words, a different threshold value may be used between different datasets from the same sensor device.

In embodiments, the plurality of datasets comprise one or more of: speed (e.g. determined from a GNSS receiver); heart rate (e.g. determined from a heart rate sensor); acceleration (e.g. determined from a GNSS receiver); vertical speed (e.g. determined from a barometer); rotation (e.g. determined from a gyroscope); and G-force (e.g. determined from an accelerometer). The speed dataset can be used to determine a maximum speed, for example, of the user, camera or equipment (based on the location of the sensor device) during the time period in which the video image data was recorded. The heart rate dataset can be used to determine a maximum heart rate, for example, of the user, camera or equipment (based on the location of the sensor device) during the time period in which the video image data was recorded. The acceleration dataset can be used to determine a maximum acceleration and/or maximum deceleration, for example, of the user, camera or equipment (based on the location of the sensor device) during the time period in which the video image data was recorded. The vertical speed dataset can be used to determine a maximum vertical speed, for example, of the user, camera or equipment (based on the location of the sensor device) during the time period in which the video image data was recorded. The rotation dataset can be used to determine a maximum rotation, for example, of the user, camera or equipment (based on the location of the sensor device) during the time period in which the video image data was recorded. The G-force dataset can be used to determine a maximum G-force, for example, of the user, camera or equipment (based on the location of the sensor device) during the time period in which the video image data was recorded.

In embodiments, a score is determined for each of the identified extrema. The score is preferably determined using the data value of the identified peak, together with the data values in the other datasets at the same time as the identified extremum. Preferably, each of the data values used to determine the score are normalised with respect to the other data values in their respective datasets. For example, each data value used to determine the score is preferably divided by the maximum data value in its respective dataset. The score for an identified extreme is then preferably determined by calculating a mean of the normalised data values from each of the plurality of datasets at the time of the identified extremum. Accordingly, each identified extremum is associated with a time and a data value, and optionally a type identifying the dataset in which the extremum was identified and/or a score.

As discussed above, a plurality of clusters are generated based on a determination, for each of the identified extrema, if the time of an extremum is within a predetermined time of the time of another of the extrema. Each cluster has a start time and an end time, which together define a duration for the cluster. The start time for the cluster corresponds to the earliest of the times of the extrema in the cluster, while the end time corresponds to the latest of the times of the extrema in the cluster. Each cluster preferably further comprises a cluster score, wherein the cluster score is preferably based on the score of the individual identified extrema in the cluster. For example, the cluster score can be a mean, optionally a weighted mean, of the scores of the individual scores. The use of a weighted mean allows the different individual datasets to have a different impact on the cluster score.

In embodiments, two or more clusters can be combined to create a single cluster, e.g. if the two or more clusters are within a predetermined time of each other, such as 2 seconds. For example, a first cluster can be combined with a second cluster if the end time of the first cluster is within a predetermined time of the start time of the second cluster. The resultant single cluster will preferably have a set of properties based on the properties of the clusters that were combined to create it. For example, if a first cluster is combined with a second cluster, the first cluster being earlier in time than the second cluster, then the resultant cluster will have the start time of the first cluster and the end time of the second cluster. The score of the resultant cluster will preferably be based on the score of the clusters that are combined, e.g. as a mean of the clusters of the combined clusters.

At least some or all of the clusters, either an original cluster or resulting from a combination of clusters, are used to create highlights identifying time periods of interest, e.g. to the user, in the video image data. As will be appreciated, each cluster is preferably used to create an individual highlight, which is then preferably stored, as discussed above, in a metadata portion of the digital media file. In embodiments, each of the clusters are ranked (or sorted) based on their cluster scores, and only some of the clusters are used in the creation of highlights. For example, only a predetermined number of clusters may be used to create highlights, e.g. due to the need to reserve memory such that the one or more metadata portions can be located at the start of the media file. The predetermined number of clusters can be a fixed number, e.g. only 10 automatic highlights are created, or can be a variable number, e.g. based on the number of manual highlights, such that only a maximum number of highlights are created and added to a media file. Additionally, or alternatively, only those clusters with a cluster score above a predetermined value are preferably used in the creation of highlights.

In embodiments, the time window associated with a highlight created from a cluster, i.e. an automatic highlight, is preferably of at least a predetermined size, such as 6 seconds. This can help improve, for example, the display of such highlights on a computing device as will be discussed in more detail below. Accordingly, in some embodiments, if the duration of a cluster is less than the predetermined time, e.g. 6 seconds, then the start and/or end times of the cluster can be modified, such that the resultant highlight has a time window of the predetermined size.

As discussed above, a highlight, and preferably each highlight, preferably comprises one or more of the following information: (i) an unique identifier; (ii) a type identifying the type of tag or highlight; (iii) a tag time identifying the time when the tag was generated; (iv) a start time identifying the start of the highlight; (v) an end time identifying the end of the highlight; and (vi) additional information. The type for an automatic highlight, i.e. a highlight created from a cluster, can include information identifying a dataset with an extremum that lead to the creation of the highlight, and preferably identifying the dataset of the extremum with the highest score of the extrema in the cluster. Therefore, for example, the type for an automatic highlight can be one of the following: speed; G-force; rotation (or spin); acceleration; deceleration; vertical speed; and heart rate. The start and end times for an automatic highlight are preferably determined as described above. In embodiments, an artificial tag time is associated with an automatic highlight, e.g. for use when displaying and using highlights on a computing device; the tag time is artificial since an automatic highlight is typically not derived from a single point time in contrast to a manual tag. The tag time for an automatic highlight can be any time between the start and end times of the highlight, and can even be one of the start and end times. However, in preferred embodiments, the tag time is the central time of the highlight, i.e. equidistance from the start and end times of the highlight.

In some aspects and embodiments of the invention, the highlight data, e.g. comprising one or more tags and/or highlights, that identifies one or more times of interest in video image data is stored in a metadata portion of a digital media file including the video image data. The storage of the highlight data in this manner is advantageous in that it allows efficient read access to the highlight data, e.g. by a computing device remote from the camera, and also efficient write access to the highlight data, e.g. to allow the information associated with a highlight, such as the start time and/or the end time, to be modified in a post-processing step, e.g. based on a user input, after the recordal of the video image data (and thus after the creation of the digital media file).

Accordingly, in embodiments, the highlight data of a media file can be modified after the creation of the file. The modification of the highlight data can include the addition of new tags and/or highlights to the highlight data; such new tags and highlights preferably being manual highlights created by a user watching the video image data on a computing device. Additionally, or alternatively, the modification of the highlight data can include the modification of an existing tag and/or highlight in the highlight data, such as changing the tag time of a tag (or highlight), changing the start time and/or end time of a highlight, etc. Additionally, or alternatively, the modification of the highlight data can include the deletion of existing tags and/or highlights in the highlight data, e.g. to remove manual highlights that were added accidently, to remove automatic highlights to relate to times in the video image data that are of no interest to the user. The modification of the highlight data in a media file is preferably performed on the computing device with the memory storing the media file. The modification can therefore be performed by the video camera, or can be any other computing device as desired. The modification of the highlight data can be performed based on instructions (or commands) generated on the computing device that performs the modification, or based on instructions (or commands) generated on a remote computing device and that are transmitted, e.g. via a wired or wireless connection, to the computing device performing the modification. For example, and as will be discussed in more detail below, the modification instructions can be generated on a mobile computing device, such as a smartphone, and wirelessly transmitted to the video camera, with the highlight data in the media file being modified on the video camera according to the received instructions.

In some embodiments of the invention, new tags and/or highlights can be created based on highlight data, such as manual tags and/or highlights, created by other users. In other words, manual tags and/or highlights can be crowd-sourced, and used to suggest new tags and/or highlights to a user. Indeed, it is believed that the crowdsourcing of manual tags from a plurality of users to create highlights is new and advantageous in its own right.

Thus, in accordance with another aspect of the present invention, there is provided a method of identifying one or more times of interest in video image data collected by a digital video camera during a time period, said digital video camera having a position determining device associated therewith, the method comprising:

accessing a digital media file comprising the video image data and first position data, the first position data being representative of the change in position of the digital video camera during the time period;

transmitting said first position data to a server;

receiving second position data from the server, the second position data identifying one or more positions of interest in the first position data; and adding highlight data to the digital media file, the highlight data identifying one or more times of interest in the video image data corresponding to at least some of the one or more positions of interest in the second position data.

The present invention extends to a system, such as a computing device, and preferably a mobile computing device, and/or a digital video camera, for carrying out a method in accordance with any of the aspects or embodiments of the invention herein described, Thus, in accordance with another aspect of the invention, there is provided a system for identifying one or more times of interest in video image data collected by a digital video camera during a time period, said digital video camera having a position determining device associated therewith, the system comprising:

means for accessing a digital media file comprising the video image data and first position data, the first position data being representative of the change in position of the digital video camera during the time period;

means for transmitting said first position data to a server;

means for receiving second position data from the server, the second position data identifying one or more positions of interest in the first position data; and means for adding highlight data to the digital media file, the highlight data identifying one or more times of interest in the video image data corresponding to at least some of the one or more positions of interest in the second position data.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, the first position data preferably forms part of the sensor data, which is, in preferred embodiments, stored in a metadata portion of the media file; the video image data in contrast being stored in a payload portion of the media file.

The first position data is representative of the change in position of the digital video camera, e.g. of the position determining device associated with the camera. In other words, the first position data comprises data indicative of the position of the camera collected substantially continually or at, preferably regular, intervals during the time in which the video image data is recorded. In embodiments, the first position data comprises a set of geographic coordinates, such as latitude, longitude and elevation, e.g. as obtained from a GNSS sensor, and optionally a pressure sensor, associated with the camera, together with a time stamp for each geographic coordinate. The time stamp is indicative of the time at which the geographic coordinate was recorded, and can be in the form of an absolute value, e.g. as a UTC value, or a relative value, e.g. as an offset from the beginning and/or end of the video image data.

In some aspects and embodiments of the invention, the first position data is transmitted to a server. The first position data can comprise all of the position data collected and stored during the time period in which the video image data was recorded, i.e. the entire position dataset within the sensor data stored in the media file. In other embodiments, the first position data can comprise a portion of the position dataset within the sensor data. The first position data can be transmitted to the server, together with other datasets from the sensor data stored in the media file, or appropriate portions thereof. For example, and as described in WO 2013/037860 A1, the entire content of which is incorporated herein by reference, information concerning the speed, heading and/or acceleration of the digital video camera and/or the user of the camera, and/or information concerning the quality of the position data, e.g. based on the accuracy of a GNSS receiver used to determine the position, can be used to improve the estimate of the path taken by the camera during the time period.

The first position data received at the server is processed to determine second position data identifying one or more positions of interest in the first position data. The positions of interest are preferably based on manual highlights created by other users. As discussed above, at least some of the highlights for a media file can be generated based on a manual input, e.g. during the recording of the associated video image data, such as by actuating a button on the digital video camera, or after the recording, such as by interaction with a computing device when reviewing video image data.

The server preferably receives a plurality of datasets from a plurality of different users in relation to different recording events. Each dataset includes at least data identifying the position of one or more, and preferably all, manual highlights created by a user. In embodiments, the received dataset includes the position of the camera at the tag time associated with a highlight (and which can be found, in some embodiments, in the highlight data associated with a media file). In other embodiments, the received dataset includes the position of the camera at the start time and end time of the time period represented by the highlight. Preferably, however, the received dataset includes data identifying the changing position of the camera in the time period represented by the highlight (and which can be found, in some embodiments, in the sensor data associated with a media file). The server preferably processes the plurality of received datasets to identify a plurality of positions of interest, e.g. as point locations, line locations and/or area locations; such positions of interest being geographical locations where users have found it is desirable to create manual highlights, and where it can therefore be assumed that there is a landform, i.e. a nature feature of the Earth's surface, such as a feature, e.g. a hill, valley, etc, and/or a man-made feature that users have wanted to mark for later viewing.

The server thus preferably comprises, or has access to, a database of stored positions of interest, e.g. as point geographic locations, line geographic locations and/or area geographic locations. When first position data is received at the server, the server preferably compares the first position data to the stored positions of interest in order to identify one or more positions of interest in the first position data. The comparison is preferably based on one or more of a distance measure and a heading measure. For example, the comparison may comprise defining a bounding area based on the first position data; where the bounding area identifies a geographic region within which the camera moved during the time period. The bounding area can be any area as desired, provided it encompasses all of the first position data, such as, for example, a rectangle bounding the trace formed by the first position data. The server uses the bounding area to identify any stored positions of interest that are within the bounding area. By comparing the first position data to the stored positions of interest within the bounding area, e.g. by determining if a position falls within an stored area of interest, by determining if a position is within a predetermined distance of a stored point or line of interest, etc, then it is possible to identify one or more positions of the first position data that relate to stored positions of interest, and which the second position data.

In some aspects and embodiments of the invention, the second position data is transmitted from the server to the camera or associated computing device. The second position data identifies one or more positions of interest in the first position data. The second position data can be of any form that identifies point locations within the first position data. For example, the second position data could comprise one or other, or both, of the time stamp and geographic coordinate of the first position data sent to the server. In preferred embodiments, the second position data comprises one or more time values indicative of times within the time period of the video image data.

The received second position data, e.g. one or more geographic coordinates and/or time stamps, are used to generate tags and/or highlights for the digital media file. For example, the time stamps can be used as the time for a tag, and thus as the basis for the time window defining a highlight. Alternatively, the geographic coordinates can be used to determine a corresponding time of interest within the time period of the video image data, e.g. by comparing with the sensor data associated with the media file, and the determined time of interest is used as the time for a tag, and thus as the basis for the time window defining a highlight.

The highlight data can be generated automatically based on the received position data, or, in embodiments, the highlight data can be generated based on an input received from a user. For example, in embodiments, a computing device can be used to display a representation of the potential highlight data to a user on a display device of the computing device and/or to play (or preview) the video image data associated with the potential highlight; as described in more detail below. The user, after viewing the potential highlight, can then accept the highlight, or accept an amended version of the highlight, e.g. by adjusting the start and/end times of the highlight, and cause the highlight to be added to the highlight data in the metadata portion of the media file.

As will be appreciated, the computing device and/or digital video camera that is arranged to perform the above described invention is preferably also arranged to transmit one or more datasets including data identifying the position of one or more, and preferably all, manual highlights that are created for one or more, and preferably all, recorded digital media files. In other words, the computing device and/or digital video camera is preferably arranged to provide data indicative of manual tags for use in generating the database of stored positions of interest, in addition to being arranged to make use of the database for suggesting tags and/or highlights.

The present invention, in at least some aspects and embodiments, also extends to a computing device, e.g. a server, that is arranged to perform the above described method of generating a database of stored positions of interest based on a plurality of received datasets indicative of manual tags from a plurality of different users in relation to different recording events and/or the above described method of receiving first position data from a computing device and transmitting, in response to the received first position data, second position data identifying one or more positions of interest in the first position data. In accordance with at least some aspects and embodiments of the invention, and as discussed above, a digital video camera is used to create one or more media files stored on a memory, and wherein each of the one or more media files includes one or more sets of video image data, and optionally audio data, in a payload portion of the file, together with highlight data and/or sensor data in one or more metadata portions of the file. The sensor data is based on data received from one or more sensor devices that are associated with the video camera, and is contemporaneous with the one or more sets of video image data. The highlight data identifies one or more times of interest in the one or more sets of video image data. Preferably, the one or more media files stored on the memory are accessed by a computing device, such as desktop computer, laptop computer, tablet computer, smartphone, etc, so as allow the media content in the files to be played and displayed to a user and/or to allow a user to edit the media content in the files.

The one or more media files can be accessed in any desired manner. For example, the one or more media files can be transferred from the memory to a separate memory of the computing device. Additionally, or alternatively, the memory storing the one or more media files could be a removable memory, such as a memory card, and the memory itself is transferred and added to, i.e. installed on, the computing device.

In some embodiments, the media content in the files can be transferred over a wireless connection, i.e. streamed, to the computing device, e.g. from the video camera. As discussed above, the one or more media files are preferably structured such that the one or more metadata portions are located at the front of the file, so as to facilitate streaming of the media content in the file.

Entire media files, rather than just the content contained therein, can also, in some embodiments, be transferred to the computing device. As will be discussed in more detail below, however, such media files (that are transferred over a wireless connection) will typically not be media files created during the recording of data by the digital video camera, but instead are preferably media files that are generated, e.g. in a transcoding process, from the media files created during the recording of data.

The computing device, once having accessed the one or more media files, preferably displays a representation of each of the one more media files to a user on a display device of the computing device. This representation can be selected by the user, e.g. using a computer pointing device, such as a computer mouse, via a touch on a touchscreen display, etc, to allow the media file associated with the representation to be played, deleted and/or manipulated, e.g. renamed, moved to a new location in memory, etc. The representation can include a thumbnail image, which is preferably a frame from the video image data contained in the respective media file. The representation can also information, preferably superimposed over the thumbnail image, identifying one or more of: the type of video image data in the file (e.g. data indicative of the resolution and/or frame rate of the video image data); a duration of the media file; and the number of times of interest identified in the highlight data for the file (e.g. the number of the highlights).

In embodiments, the computing device, once having accessed the one or more files, can additionally, or alternatively, display a representation of the highlight data in the one or more media files to a user on a display device of the computing device. The highlight data, as described above, preferably comprises a plurality of highlights, each having a start time and an end time with respective to the associated video image data. Thus, in embodiments, the representation of the highlight data displayed to the user preferably comprises a representation of one or more or all highlights in the one or more media files. This representation can be selected by the user, e.g. using a computer pointing device, such as a computer mouse, via a touch on a touchscreen display, etc, to allow the highlight associated with the representation to be played, deleted and/or selected, as discussed in more detail below, for combining with other highlights to create a highlights video (e.g. a summary or story of interesting and/or exciting moments in the video image data recorded by the video camera. The representation can include a thumbnail image, which is preferably a frame from the video image data contained in the respective media file for the time window defined by the respective highlight. The representation can also include information, preferably superimposed over the thumbnail image, identifying one or more of: the origin of the highlight, e.g. whether the highlight is a manual highlight or an automatic highlight; the type of automatic highlight; and a value associated with the highlight, such as, for an automatic highlight, the value of an extremum that lead to the creation of the highlight (e.g. maximum speed, maximum acceleration, etc), and, for a manual highlight, the tag time of the highlight.

The representation of the media file and/or highlight, e.g. thumbnail image, can include a single frame from the relevant video image data (i.e. a static image). Additionally, or alternatively, in some embodiments, when a pointer of a pointing device, such as a computer mouse or a finger in the case of touchscreen display, is positioned on the thumbnail image, the thumbnail image may cycle through a series of predetermined frames from the relevant video image data, so as to show a brief summary (or preview) of the video image data contained in the associated media file to the user. Additionally, or alternatively, in some embodiments, when a pointer of a pointing device is moved or transitions across the thumbnail image, the thumbnail image may show a preview of the video image data contained in the associated media file to the user, wherein the position of the pointer is used to select the frame on which the displayed thumbnail image is based. In other words, the relative position of the cursor or finger along a timeline defined relative to the thumbnail image can be used to select a relevant frame from the video image data, which is then used to generate the displayed thumbnail image. It is believed that the previewing of video image data by moving a pointer across a display window is new and advantageous in its own right.

Thus, in accordance with another aspect of the present invention, there is provided a method of previewing video image data using a computing device, the method comprising:

accessing a digital media file comprising the video image data;

displaying a thumbnail image representative of the digital media file in a display window on a display device of the computing device;

defining a timeline extending from a first position on a boundary of the thumbnail image to a second position on the boundary of the thumbnail image, such that the first position represents a start time of the video image data and the second position represents an end time of the video image data, and using the timeline to divide at least a portion of a first area defined by the boundary into a plurality of second areas, such that each of the second areas is representative of a different time period between the start time and the end time;

selecting a frame from the video image data based on the time period associated with the second area in which a pointer of a pointing device is located; and using the selected frame to generate a new thumbnail image for display in the display window, such that the movement of the pointer from one second area to another causes a change in the displayed thumbnail image.

The present invention extends to a system, such as a computing device, e.g. a desktop computer, laptop, tablet, mobile phone, etc, for carrying out a method in accordance with any of the aspects or embodiment of the invention herein described.

Thus, in accordance with another aspect of the invention, there is provided a system for previewing video image data using a computing device, the system comprising:

means for accessing a digital media file comprising the video image data;

means for displaying a thumbnail image representative of the digital media file in a display window on a display device of the computing device;

means for defining a timeline extending from a first position on a boundary of the thumbnail image to a second position on the boundary of the thumbnail image, such that the first position represents a start time of the video image data and the second position represents an end time of the video image data, and using the timeline to divide at least a portion of a first area defined by the boundary into a plurality of second areas, such that each of the second areas is representative of a different time period between the start time and the end time;

means for selecting a frame from the video image data based on the time period associated with the second area in which a pointer of a pointing device is located; and means for using the selected frame to generate a new thumbnail image for display in the display window, such that the movement of the pointer from one second area to another causes a change in the displayed thumbnail image.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, the video image data of the media file that is previewed using the above technique can be the entire video image data of the file or can be the video image data associated with a highlight. In the former case, the first and second positions on the boundary, i.e. the start and end of the timeline, represent, respectively, the start and end of the video track in the file. Whereas, in the latter example, the first and second positions on the boundary represent, respectively, the start and end times of the highlight (with respect to the start and/or end of the video track in the file).

In some aspects and embodiments of the invention, one or more, and preferably a plurality of, media files comprising video image data is accessed by the computing device. A media file can be stored in a memory of the computing device and thus accessed using a wired connection, or alternatively can be stored in a memory of the video camera and accessed over a wireless connection. The video image in the media file may be stored in a payload portion of the file and encoded using one or other of an interframe compression technique and an interframe compression technique. As will be appreciated, it is less computationally expensive, i.e. requires less processing, to access frames of the video image data that is encoded using an intraframe compression technique, since each frame is compressed without reference to another frame. Accordingly, as discussed in more detail below, each frame within the video image data can be accessed and, if required, appropriately scaled for use as displayed thumbnail image. The method can, however, be applied using video image data that is encoded using an interframe compression technique; for example by accessing key frames (i.e. complete images stored within the data stream) and using these frames, again appropriately scaled if required, for use as the displayed thumbnail image.

In preferred embodiments, the digital media file has a payload portion comprising a first track in which the video image data is encoded using an interframe compression technique and a second track in which the video image data is encoded using an intraframe compression technique. The first track is preferably used when playing or scrubbing (e.g. reviewing) the file, while the second track, typically lower resolution track, can be used when previewing the file, e.g. as discussed above.

A representation of each of the one or more media files is displayed in a display window on a display device. Each representation comprises a thumbnail image, such as one based on a frame at a predetermined position between the start time and end time of the video image data, e.g. 10%, 20%, etc from the beginning of the video image data. As discussed above, each thumbnail image may have additional information relating the media file, video image data and/or the highlight data superimposed over the thumbnail image. When representations of a plurality of media file are displayed in the display window, then the thumbnail images may form a grid. Each thumbnail image can be individually selected, or can be selected as a group, by a user, e.g. based on a received touch or using a computer mouse, to initiate one or more actions concerning the media file and/or highlight data associated with the thumbnail image, such as moving the media file from one memory to another (e.g. from a memory card to a local hard disk), deleting the media file from memory, causing the video image data to be played, etc. Each thumbnail image can be of any shape as desired, such as a rectangle, square, circle, etc.

A timeline is defined that extends from a first position on a boundary of the thumbnail image to a second position on the boundary of the thumbnail image. The timeline represents the length of the video image data, e.g. the entire video or the highlight, such that the first position is indicative of a start time of the video image data and the second position is indicative of an end time of the video image data. The timeline is used to divide at least a portion of a first area defined by the boundary into a plurality of second areas, such that each of the second areas is representative of a different time period between the start time and the end time. In an embodiment, the first area corresponds to the area of the thumbnail image, and thus for example could be rectangular or circular. The first area could, in other embodiments however, correspond to only a portion of the thumbnail image. For example, the area could be a strip following an edge or other portion of the boundary. In a preferred embodiment, wherein the shape of the thumbnail image is rectangular, the timeline may extend from one edge to an opposite edge.

The first area may be divided in the plurality of second areas by defining normal lines to the timeline. Normal lines may be defined based on the frame rate of the video image data in the case of intraframe encoded video image data, or the rate of key frames in the case of interframe encoded video image data, such that each second area relates to a different frame from the video image data.

A frame is selected from the video image data based on the time period associated with the second area on which a pointer of a pointing device is located. The pointer may be a location indicated by a finger, stylus, etc or a cursor associated with a computer mouse, touchpad, etc. The selected frame is used to generate a new thumbnail image for display in the display window, i.e. in replace of the current thumbnail image. The thumbnail image may correspond to the entire selected frame, or it may be a portion of the selected frame; optionally with the frame being scaled to fit within the first area as defined by the boundary of the thumbnail image. As will be appreciated, the frame that is used to generate the thumbnail image is based on the particular second area in which the pointer is located, such that movement of the pointer from one second area to another, e.g. in response to the receipt of an input from a user, causes the displayed thumbnail image to change. Thus, for example, when moving from one second area to an adjacent second area toward the end time of the timeline, then the thumbnail image will change to a next frame of the video image data, i.e. the succeeding frame. Similarly, for example, when moving from one second area to an adjacent second area toward the start time of the timeline, then the thumbnail image will change to a previous frame of the video image data, i.e. the preceding frame, Thus, by moving the pointer along the portion of the first area through each second area in turn from the start of the timeline to the end of the timeline, the thumbnail images will change to permit the user to preview the video image data. Accordingly, in embodiments of the invention, the computing device sends a request to the camera to play (or preview) media data, such as a video or highlight, stored on a memory of the camera. The request can be generated following receipt of a user input on the computing device selecting one or more videos and/or highlights to be played, e.g. through the selection of a displayed representation as described above. The request can also be generated automatically by the computing device, or software running thereon, e.g. if multiple videos and/or highlights are requested to be played subsequently, either randomly or in a particular order. After receipt of such a request, the video camera transfers (or streams) the requested media data to the computing device, e.g. over a connection established by a wireless communication device in the camera and a corresponding wireless communication device in the computing device. The media data that is transferred is preferably an encoded media stream. The encoded media stream can be, for example, an encoded video stream, such that the computing device displays only video image data, i.e. the request video or highlight video. Alternatively, the encoded media stream can be an interleaved stream comprising, for example, video image data and audio data.

Accordingly, in some embodiments, the encoded media stream transferred (or streamed) to the computing device can be the payload portion of a media file, or relevant portion thereof when a highlight is requested, e.g. when the media file only includes a video track, or a video track and an audio track. In other embodiments, and for example wherein the payload portion of the media includes first and second video image data, e.g. one in a video track and another in a text track as described above, the payload portion of the media file may first need to be demultiplexed into its constitute encoded streams, e.g. by a demultiplexer of the camera. The encoded media stream transferred to the computing device may therefore comprise one of the encoded streams output by the demultiplexer, e.g. the video image data from the text track of the media file, or a plurality of the encoded streams output by the demultiplexer, e.g. the video image data from the text track of the media file and the audio data from the audio track of the media file, and which have been interleaved into a single encoded stream by a multiplexer of the camera.

The computing device, e.g. a smartphone, therefore preferably comprises at least one decoder to decode the data in the encoded media stream, such that the decoded data can then be shown to the user on the display device of the computing device. Preferably, however, the computing device comprises a demultiplexer and a plurality of decoders, such that when the computing device receives an interleaved encoded media stream from the camera, e.g. with both video and audio data, the computing device can separate the encoded streams and decode the audio and video data contained therein, such that the user is able to preview a video or highlight video with audio.

In embodiments in which the video camera communicates with the (remote) computing device using a wireless connection, the two devices are preferably capable of communicating with each other using two different communication protocols, preferably short-range communication protocols. For example, the video camera, and thus the computing device, comprises a first wireless communication device capable of communicating using a first communication protocol and a second wireless communication device capable of communicating using a second communication protocol. The first communication device and associated protocol is preferably used as a control channel allowing the computing device to, for example, trigger status and operational changes in the video camera. The second communication device and associated protocol meanwhile is preferably used as a data channel allowing for the exchange of data between the camera and the computing device, such as data from one or more media files stored in a memory of the video camera. As will be appreciated, the control channel is typically a low bandwidth channel, whereas the data channel is typically a high bandwidth channel.

The first communication device preferably comprises a Bluetooth Low Energy (BLE) transceiver. As known in the art, BLE is lower power communication protocol that is designed for applications requiring low data rates and short duty cycles (in comparison to classical Bluetooth). In BLE, and other similar low energy communication protocols, a connection is only established between devices when there is data to be transferred. This is in contrast to communication protocols, such as classical Bluetooth and WiFi, wherein a connection is maintained between devices even when there is no data to be transferred. For this reason, however, BLE and other similar communication protocols typically have a limitation on the size of the data packets that can be transferred between connected devices. The second communication device, meanwhile, preferably comprises a WiFi transceiver. Such connection-orientated communication protocols can be used to exchange large quantities of data between devices in a frequent or continuous manner, which the limited data packet size of low energy communication protocols do not allow or at least make inefficient. While the first communication device is described herein primarily with regard to the BLE communication protocol, it will be appreciated that any suitable lower power communication protocol can be used, such as ANT and ZigBee. Similarly, while the second communication device is described herein primarily with regard to the WiFi communication protocol, it will be appreciated that any suitable connection-orientated communication protocol can be used, such as classical Bluetooth.

In embodiments of the present invention, the control channel (provided by the first communication device of the camera) is used by the computing device to activate (or turn on) the second communication device in the camera. This allows, for example, a connection between the camera and the computing device to be established only when required, e.g. to allow the computing device to access and obtain data from media files stored on the video camera. Once the data has been transferred, then the computing device can send another command over the control channel to deactivate (or turn off) the second communication in the camera.

It is believed that a video camera capable of connecting to a remote computing device using two different wireless communication protocols, one for use a control channel and the other as a data channel, and activating the communication device to establish data the channel only upon receipt of a command over the control channel is new and advantageous in its own right.

Thus, in accordance with another aspect of the present invention, there is provided a method of transmitting data from a digital video camera to a remote computing device, said video camera having: a first wireless communication device capable of communicating using a first communication protocol with a remote computing device; and a second wireless communication device capable of communicating using a second communication protocol with the remote computing device, the method comprising:

receiving, at the first wireless communications device from the computing device, a first command to activate the second wireless communication device from the computing device;

activating the second wireless communication device and establishing a connection between the camera and the computing device using the second wireless communication device based on receipt of the first command;

receiving, at the second wireless communication device over the established connection from the computing device, a request for at least one of: video image data received from an image sensor of the camera; and data from one or more media files stored in a memory of the video camera;

transferring the requested data from the video camera to the computing device over the established connection using the second wireless communication device;

receiving, at the first wireless communications device from the computing device, a second command to deactivate the second wireless communication device from the computing device; and deactivating the second wireless communication device based on receipt of the second command.

The present invention extends to a system, preferably a digital video camera, for carrying out a method in accordance with any of the aspects or embodiments of the invention herein described.

Thus, in accordance with another aspect of the invention, there is provided a system for transmitting data from a digital video camera to a remote computing device, said video camera having: a first wireless communication device capable of communicating using a first communication protocol with a remote computing device; and a second wireless communication device capable of communicating using a second communication protocol with the remote computing device, the method comprising: means for receiving, at the first wireless communications device from the computing device, a first command to activate the second wireless communication device from the computing device;

means for activating the second wireless communication device and establishing a connection between the camera and the computing device using the second wireless communication device based on receipt of the first command;

means for receiving, at the second wireless communication device over the established connection from the computing device, a request for at least one of: video image data received from an image sensor of the camera; and data from one or more media files stored in a memory of the video camera;

means for transferring the requested data from the video camera to the computing device over the established connection using the second wireless communication device;

means for receiving, at the first wireless communications device from the computing device, a second command to deactivate the second wireless communication device from the computing device; and means for deactivating the second wireless communication device based on receipt of the second command.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, the first wireless communication device preferably comprises a BLE transceiver, or a device using a similar low energy communication protocol, such as ANT or ZigBee, wherein data is exchanged using broadcast advertising packets or over a temporarily established connection (that is broken by the master device as soon as the relevant data has been exchanged). The second wireless communication device preferably comprises a WiFi transceiver, or device using a similar connection-orientated communication protocol, such as classical Bluetooth, wherein data is exchanged using an established connection.

In some aspects and embodiments of the invention, a first command is received at the first communication device from the computing device, said first command being an instruction to activate (or turn on) the second communication device. A second command is also received at the first communication device from the computing device, said second command being an instruction to deactivate (or turn off) the second communication device. This allows the second communication device to be deactivated whenever it is not needed for the exchange of data with the computing device, thereby reducing power consumption on the camera.

The first communication device can operate as an "observer" that continually scans for advertising data packets broadcast by a corresponding communication device in the computing device. Thus, in embodiments, the first and second commands are contained in advertising data packets. In such embodiments, a connection is not established between the camera and the computing by the first communication device, and the control channel formed using the first communication device is unidirectional (from the computing device to the camera).

In other embodiments, the first communication device can operate as a "peripheral" (to the corresponding communication device in the computing device), such that a connection is established between the computing device and the camera. The first and second commands are preferably therefore contained in data packets transmitted over the connection. In such embodiments, the control channel formed using the first communication device is bidirectional. This allows, for example, the camera to notify, or confirm to, the computing device when the second communication device is activated and/or deactivated, e.g. after receipt of the first and/or second command, such that a suitable notification can be provided to the user on the computing device, e.g. on a display device thereof.

In embodiments, the first command to activate the second wireless communication device in the video camera is generated following a user input on the remote computing device. The user input can be a request for the computing device to act as a viewfinder for the camera, i.e. to display the view as seen by the image sensor of the camera, and thus that will form the video image data recorded by the camera. The use of the computing device, such as a smartphone, as a viewfinder for the camera allows the suitably adjust the position of the camera on their body or piece of sports equipment without needing to see a display device on the camera, if there even is one. The user input can additionally, or alternatively, be a request for the computing device to play (or preview) the video image data in a media file stored in the memory of the camera. In such embodiments, the request can be the selection of a representation of a media file, e.g. as described above through the selection of a thumbnail image, to cause the video image data of the selected media file to be played. Alternatively, the request can be the selection of a representation of a highlight of a media file, e.g. as described above through the selection of a thumbnail image, to cause the video image data associated with the selected highlight to be played (i.e. the video image data between the start time and end time of the highlight). The user input can additionally, or alternatively, be a request for sensor data, e.g. stored in a metadata portion of a media file stored in the memory of the camera.

Additionally, or alternatively, the first command to activate the second wireless communication device in the video camera is generated automatically by the computing device, e.g. by software running thereon. For example, upon execution of the software, e.g. of an application (or app) installed on the computing device to allow the viewing and editing of video image data, the software may synchronise with the camera, so as to obtain data indicative of the one or more media files, and preferably their associated highlight data. This allows the computing device to display representations of the various videos and highlights stored on the camera, e.g. as described above.

The second communication device is activated, i.e. turned on, following the receipt of the first command by the first communication device, and a connection established between the video camera and the computing device. The established connection is then used by the computing device to send a request for data to the video camera. The requested data will be dependent on the action that triggered the generation of the first command, e.g. on the user input on the computing device.

For example, when the request is for the computing device to act as a viewfinder for the camera, then the request transmitted over the established connection is a request for video image data received from an image sensor of the camera. In such embodiments, the data that is transferred (or streamed) to the computing device is preferably an encoded video stream output from the video processing device of the camera (and generated from data received from the image sensor of the camera), and preferably a video stream encoded using an intraframe compression technique. As discussed above, such an encoded video stream preferably comprises a stream wherein each frame is compressed as a jpeg image. Each jpeg image can be at a resolution of 768×432 px, and the stream may have a frame rate of 30 fps; although it will be appreciated that the values are merely exemplary. The computing device, as discussed above, preferably comprises a decoder to decode the received encoded video stream, and display the resultant video image data on the display device of the computing device.

In other embodiments, when the request is for the computing device to play (or preview) a video or a highlight, then the request transmitted over the established connection is a request for video image data, and optionally audio data, in a media file stored in the memory of the camera. In such embodiments, the data that is transferred (or streamed) to the computing device is preferably an encoded media stream. As discussed above, the encoded media stream can be, for example, an encoded video stream, such that the computing device displays only video image data, i.e. the request video or highlight video. Alternatively, the encoded media stream can be an interleaved stream comprising, for example, video image data and audio data. In some embodiments, the data that is transferred to the computing device can also include the sensor data for the media file, or for the highlight, such that the sensor data can be displayed simultaneously with the video or highlight as it is played by the computing device.

In other embodiments, when the request is for computing device to obtain information about the one or more media files stored on the memory of the video camera, then the request transmitted over the established connection can be a request for the number of media files stored on the memory, and optionally, for each of the files, one or more of the following: the time at which the file was created; the size of the file; the duration of the video image data in the file; the number of tags and/or highlights stored in the file; the resolution of the video image data in the file; the frame rate of the video image data in the file; and the aspect ratio of the video image data in the file.

In some aspects and embodiments of the invention, preferably following the receipt of the requested data from the mobile computing device, e.g. after the user closes the viewfinder, finishes playing a video or highlight, closes the app, etc, a second command is generated by the computing device. The second command is transmitted by a communication device in the computing device, e.g. in a broadcast advertising data packet or in a data packet transmitted over an established connection, and received by the first communication device in the camera. The second communication device is deactivated based on receipt of the second command.

While the control channel between the camera and the computing device formed by the first communication device using the first wireless communication protocol, e.g. BLE, has been described with respect to the activation and deactivation of the second communication device to form a data channel, the control channel can also be used to provide additional functionality. For example, the control channel can be used to adjust settings of the camera based on a commands received from the computing device, which may be generated, for example, based on an input from a user. For example, the control channel can also be used to cause changes or adjustments to one or more of the following settings of the camera: resolution; frame rate; white balance (i.e. to adjust the overall colour tone of the video image data); colour (i.e. to adjust the colour profile of the video image data); gain or ISO limit (i.e. to adjust the sensitivity of the camera in low light environments); sharpness (i.e. to adjust the sharpness of the video image data); and exposure (i.e. to correct for environments with contrasting light conditions).

As described above, in embodiments of the invention, the computing device, e.g. desktop, laptop, smartphone, etc, is arranged to access one or more media files and to play (or preview) at least video image data from the one or more files, e.g. a video, a highlight video, etc. The video image data being played is preferably displayed in a display window on a display device of the computing device. A timeline (or playback bar) is preferably also displayed simultaneously with the video image data. One end of the timeline indicates the start of the video currently being played, with the other end of the timeline indicating the end of the video currently being played. Thus, the timeline can be said to form a schematic representation of the video image data over the duration of the video. The timeline may, in some embodiments, be formed as a straight line. The timeline preferably further includes an icon (or slider) that moves along the timeline as the video is played, so as to show the location along the timeline of the video image data currently being displayed. The icon (or slider) can preferably be manipulated by the user, i.e. by moving the icon along the timeline, so as to allow the user to select the video image data being displayed. The process of the user manipulating the icon in this manner is referred to as "scrubbing", and is often used in video editing to allow a user to select one or more portions of a video to be retained or deleted in the creation of an edited video.

It has been recognised that sensor data based on data received from one or more sensor devices associated with the camera, and which is contemporises with video image data recorded by the camera, can be advantageously used in the scrubbing of a video. Thus, in some aspects and embodiments of the invention, the timeline comprises a representation of the sensor data, and preferably a representation of one or more datasets in respect of a variable obtained from the one or more sensor devices. Indeed, it is believed that the use of contemporaneous sensor data to scrub video image data is new and advantageous in its own right.

Thus, in accordance with another aspect of the present invention, there is provided a method of reviewing video image data collected by a digital video camera during a time period using a computing device, said digital video camera having one or more sensor devices associated therewith, the method comprising:

accessing a digital media file comprising the video image data and sensor data, the sensor data being based on data received from the one or more sensor devices during the time period;

displaying the video image data in a first display window on a display device of the computing device; and simultaneously displaying a timeline in a second display window on the display device, together with an icon having a location relative to the timeline to show the video image data currently being displayed in the first display window, and wherein the timeline comprises a representation of the sensor data;

receiving an input from a user on an input device of the computing device to change the location of the icon relative to the timeline; and changing the video image data being displayed in the first display window to correspond to the changed location of the icon relative to the timeline.

The present invention extends to a system, such as a computing device, and preferably a mobile computing device, for carrying out a method in accordance with any of the aspects or embodiments of the invention herein described.

Thus, in accordance with another aspect of the invention, there is provided a system for reviewing video image data collected by a digital video camera during a time period using a computing device, said digital video camera having one or more sensor devices associated therewith, the method comprising:

means for accessing a digital media file comprising the video image data and sensor data, the sensor data being based on data received from the one or more sensor devices during the time period;

means for displaying the video image data in a first display window on a display device of the computing device; and means for simultaneously displaying a timeline in a second display window on the display device, together with an icon having a location relative to the timeline to show the video image data currently being displayed in the first display window, and wherein the timeline comprises a representation of the sensor data;

means for receiving an input from a user on an input device of the computing device to change the location of the icon relative to the timeline; and means for changing the video image data being displayed in the first display window to correspond to the changed location of the icon relative to the timeline.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, as described above, the one or more sensor devices, preferably a plurality of sensor devices, are preferably used to measure at least one of: movements or other physical parameters of the user, camera, item of sports equipment and/or vehicle, such as position, speed, acceleration, etc (e.g. during the outdoor or sports session while video image data is being recorded); environmental conditions around the user and/or camera, such as temperature, pressure, etc; and physiological properties of the user, such as heart rate, VO2 max, etc. Furthermore, the media file is preferably structured such that the video image data is stored in a payload portion of the file and the sensor data is stored in a metadata portion of the file. The sensor data also preferably includes one or more datasets, and preferably a plurality of datasets, wherein each dataset is in respect of a variable obtained, directly or indirectly, from the one or more sensor devices.

In some aspects and embodiments of the invention, a media file comprising video image data and sensor data is accessed by the computing device. The media file can be stored in a memory of the computing device, or alternatively can be stored in a memory of the video camera and is accessed over a wireless connection. In these latter embodiments, the sensor data is preferably downloaded to a memory of the computing device (such that all the sensor data is present in a memory of the computing device), whereas the video image data is streamed over the wireless connection as required for display on the display device of the computing device.

The video image data, whether streamed or present in a local memory of the computing device, is displayed in a first display window on the display device. Meanwhile, a timeline is simultaneously displayed in a second display window on the display device, together with an icon having a location relative to the timeline to show the video image data currently being displayed in the first display window. In embodiments, the first display window may be separate from the second display window. However, in some embodiments, the display windows may at least partially overlap, and may even be the same, such that the timeline is superimposed over the video image data. The location of the icon relative to the timeline can be changed by the user, through an input on an input device, such that the video image data being displayed in the first display window is changed to correspond to that of the new location of the icon.

As discussed above, the timeline comprises a representation of the sensor data, such that the user can view the sensor data, and use this information to select a desired location of the icon (i.e. so as to scrub the video). The representation of the sensor data preferably comprises a representation showing how the data values of a variable obtained, e.g. directly or indirectly, from the one or more sensor devices change over the time period in which video image data was collected. For example, the representation of the sensor data may show how the speed, or the acceleration, or the heart rate of the user, etc, changed over the time period. In embodiments, the data from a plurality of datasets may be displayed simultaneously. Alternatively, the data from only a single dataset may be displayed, together with one or more selectable options that can be used by the display the data from another of the datasets.

In embodiments, the icon may be arranged to move along the representation of the sensor data. Alternatively, a second timeline formed as a straight line with one end representing the start of the time period and the other end representing the end of the time period may be displayed in the first or second display windows, or optionally in a third display window, and the icon is preferably arranged to move along this second timeline. In such embodiments, a marker may be displayed on the representation of the sensor corresponding to the location of the icon on the second timeline, e.g. such that the user can easily identify the relevant data values of the sensor data for the current location of the icon.

In a particular embodiment, the representation of the sensor data comprises a path showing the change in position of the user (or camera, or equipment, dependent on the location of the sensor) over the time period, e.g. based on position data determined by a GNSS receiver. This representation of the path can be superimposed over a representation of a digital map showing the terrain and/or navigable network, e.g. roads, paths, etc, over which the user travelled. As will be appreciated, this representation of the path can be displayed simultaneously with data from one or more other datasets comprising the sensor data.

In further embodiments, and wherein the media file further comprises highlight data, e.g. in metadata portion of the file as described above, one or more markers can be displayed on the display device together with the one or more timelines, e.g. a straight line, a representation of sensor data, or a combination thereof, wherein the one or markers are based on the highlight data and identify the location of the one or more times of interest on the one or more timelines. These markers allow the user to easily move the video image data being displayed to the time associated with the marker. The one or more markers can be displayed on, e.g. superimposed over, at least one of the timelines, each marker being located on the timeline based on the time of interest associated with the maker. Alternatively, the one or more markers can be displayed adjacent to the location on at least one of the timelines for the respective time of interest.

The one or more markers can be associated with a single point in time on the timeline, e.g. a tag, or can be associated with a period of time on the timeline, e.g. a highlight having an associated time window. In these latter embodiments, the one or more markers may be displayed at a single point in time on the timeline, e.g. corresponding to the tag time of a highlight, despite each marker still associated with a highlight, as will be discussed in more detail below. Alternatively, the one or more markers may be displayed together with an indication on the timeline showing the time window of the highlight.

As discussed above, highlights and/or tags can be generated from multiple sources, e.g. manually based on a user input and automatically based on sensor data, such as speed, G-force, rotation (or spin), acceleration, deceleration, vertical speed and heart rate. In preferred embodiments, the one or more markers include an identifier showing the source of the tag and/or highlight associated with each marker.

The one or more markers are preferably selectable by a user, e.g. via a touch selection when the computing device comprises a touchscreen display, so as to allow the user to change the video image data being displayed to a time associated with the marker. For example, when a marker is associated with a single point in time, e.g. a tag, then selection of the marker causes the video image data being displayed to change to the video image data associated with that point in time. In other embodiments, and when a marker is associated with a period of time, e.g. a highlight, the selection of the marker can cause the video image data being displayed to change to the video image data for a time based on the period of time, e.g. a time based on the time window of the highlight. For example the video image data displayed after selection of the marker may correspond to the video image data for a start time of the highlight or a tag time of the highlight.

It is believed that the use of one or more selectable markers associated with a period of time, e.g. a highlight, and displayed relative to a timeline, together with displayed video data, to scrub video image data is new and advantageous in its own right.

Thus, in accordance with another aspect of the present invention, there is provided a method of reviewing video image data collected by a digital video camera using a computing device, the method comprising:

accessing a digital media file comprising the video image data and highlight data identifying one or more times of interest in the video image data, said highlight data comprising at least one highlight having a start time and end time with respective to the video image data that together define a time window;

displaying the video image data in a first display window on a display device of the computing device;

simultaneously displaying a timeline in a second display window on the display device, together with one or more selectable markers, each selectable marker being associated with a highlight and having a location relative to the timeline corresponding to a time within the time window of the highlight;

receiving a selection of a marker from a user on an input device of the computing device; and changing the video image data being displayed in the first display window to correspond to the video image data for a time based on the time window of the highlight associated with the selected marker.

The present invention extends to a system, such as a computing device, and preferably a mobile computing device, for carrying out a method in accordance with any of the aspects or embodiments of the invention herein described.

Thus, in accordance with another aspect of the invention, there is provided a system for reviewing video image data collected by a digital video camera using a computing device, the method comprising:

means for accessing a digital media file comprising the video image data and highlight data identifying one or more times of interest in the video image data, said highlight data comprising at least one highlight having a start time and end time with respective to the video image data that together define a time window;

means for displaying the video image data in a first display window on a display device of the computing device;

means for simultaneously displaying a timeline in a second display window on the display device, together with one or more selectable markers, each selectable marker being associated with a highlight and having a location relative to the timeline corresponding to a time within the time window of the highlight;

means for receiving a selection of a marker from a user on an input device of the computing device; and means for changing the video image data being displayed in the first display window to correspond to the video image data for a time based on the time window of the highlight associated with the selected marker.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, as described above, the media file is preferably structured such that the video image data is stored in a payload portion of the file and the highlight data is stored in a metadata portion of the file. Furthermore, a highlight, and preferably each highlight, preferably comprises one or more of the following information: (i) an unique identifier; (ii) a type identifying the type of tag or highlight; (iii) a tag time identifying the time when the tag was generated; (iv) a start time identifying the start of the highlight; (v) an end time identifying the end of the highlight; and (vi) additional information.

In some aspects and embodiments of the invention, a media file comprising video image data and highlight data is accessed by the computing device. The media file can be stored in a memory of the computing device, or alternatively can be stored in a memory of the video camera and is accessed over a wireless connection. In these latter embodiments, the highlight data is preferably downloaded to a memory of the computing device (such that all the highlight data is present in a memory of the computing device), whereas the video image data is streamed over the wireless connection as required for display on the display device of the computing device.

The video image data, whether streamed or present in a local memory of the computing device, is displayed in a first display window on the display device. Meanwhile, a timeline is simultaneously displayed in a second display window on the display device, together with the one or more selectable markers, each selectable marker being associated with a highlight and having a location relative to the timeline corresponding to a time within the time window of the highlight. The time can be any one or more of the timelines described above, e.g. a straight line, a representation of sensor data, or a combination thereof. In embodiments, the first display window may be separate from the second display window. However, in some embodiments, the display windows may at least partially overlap, and may even be the same, such that the timeline is superimposed over the video image data.

In some aspects and embodiments of the invention, a selection of marker is received from a user, e.g. using a computer pointing device, such as a computer mouse, via a touch on a touchscreen display, etc, and the video image data being displayed in the first display window is changed to correspond to the video image data for a time based on the time window of the highlight associated with the selected marker.

In embodiments, the selection of the marker can cause the displayed video image data to change to video image data for a time within the time window of the highlight, e.g. the start time of the highlight. In other words, the selection of the marker can cause the highlight video to be played.

Additionally, or alternatively, the selection of the marker can cause a change in the video image data being displayed in the first display window and also a change in the timeline displayed in the second display window. For example, the selection can cause the timeline to be modified so as to "zoom in" to the highlight. In other words, whereas the original timeline provides a schematic representation of a time period corresponding to the duration of the media file, the new timeline provides a schematic representation of a different time period based on the duration of the highlight. This different time period can correspond to the duration of the highlight, but in preferred embodiments is larger than the duration of the highlight. For example, the time period represented by the new timeline can correspond to the duration of the highlight and an additional period of time. This additional period of time can comprise a predetermined amount of time, 4 seconds, or it can comprise a predetermined proportion of the duration of the highlight, e.g. 50% of the duration of the highlight. In embodiments, one end of the new timeline represents a first predetermined period of time before the start time of the highlight and the other end represents a second predetermined period of time after the end time of the highlight. The first and second predetermined periods of time can different, but are preferably the same and combine to equal the above described additional period of time. As will be appreciated, the video image data shown in the first display window after selection of the marker will preferably comprise the video image data corresponding to the start of the new timeline, and the user can then cause the video image data corresponding to the new timeline to be played. In embodiments, an indication is displayed on the new timeline showing the current time window for the highlight, and preferably a first indictor showing the start time of the highlight and a second indictor showing the end time of the highlight. The user can preferably interactive with the indication, and preferably with the first and/or second indictors, to modify the start time and/or end time of the highlight, e.g. by moving the first and/or second indicators along the new timeline. As discussed above, once modified in this manner, the computing device will transfer data indicative of the change in start and/or end time to the camera, such that the highlight data in the metadata portion of the media file is modified (or updated) accordingly.

In embodiments, video image data that is displayed in the first display window following selection of the marker can be different dependent on a type of selection. For example, if the selection is made in a first manner, e.g. a single tap on a touchscreen device or a single click using a computer mouse, then the displayed video image data can be caused to change to video image data for a time within the time window of the highlight, e.g. the start time of the highlight. Furthermore, if the selection is made in a second manner, e.g. a long hold on a touchscreen device or a double click using a computer mouse, then the video image data and timeline can be caused to change, i.e. to "zoom in" to the highlight, e.g. as described above.

The new timeline displayed when zooming into a highlight, can be displayed together with a further selectable marker, additionally, or alternatively, to the indication showing the current time window for the highlight. The further selectable marker can, as discussed above with respect to the original timeline, include an identifier showing the source of the highlight associated with the marker. The further marker can be selected by the user, e.g. via a touch selection when the computing device comprises a touchscreen display, so as to allow the user to play (or preview) the video image data associated with the highlight, e.g. to display the video image data corresponding to the start time of the highlight. Additionally, or alternatively, the further marker can be selected by the user to cause a change in the video image data being displayed in the first display window and also a change in the timeline displayed in the second display window. For example, the selection can cause the new timeline displayed in the second display window to be modified so as to "zoom out", i.e. return, to the original timeline providing a schematic representation of a time period corresponding to the duration of the media file.

In embodiments, the video image data that is displayed in the first display window following selection of the marker can be different dependent on a type of selection. For example, if the selection is made in a first manner, e.g. a single tap on a touchscreen device or a single click using a computer mouse, then the video image data associated with the highlight will be played in the first display window. Furthermore, if the selection is made in a second manner, e.g. a long hold on a touchscreen device or a double click using a computer mouse, then the video image data and timeline can be caused to change back, i.e. to "zoom out", to the original timeline and the original video image data.

As described above, in many aspects and embodiments of the invention, each of one or media files stored in memory, e.g. on the video camera, comprise video image data and highlight data, wherein the highlight data comprises at least one highlight identifying a time period of interest in the video image data of the respective media file. It has been recognised that these highlights can be used to automatically create a media file with the most interesting parts of recorded video image data, and which, potentially after being reviewed and modified by the user, can then be quickly shared with other users via a video sharing platform, such as YouTube®. It is believed that the use of highlight data in this manner is new and advantageous in its own right.

This, in accordance with another aspect of the present invention there is provided a method of creating a first digital media file, comprising:

accessing one or more second digital media files, each second digital media file comprising video image data and highlight data identifying one or more times of interest in the video image data, said highlight data comprising one or more highlights each having a start time and end time with respective to the video image data;

selecting a plurality of highlights from the one or more second digital media files;

placing the selected highlights into an ordered sequence;

obtaining a third digital media file for each highlight in the ordered sequence, each third digital media file comprising video image data obtained from a second digital media file based on the start time and end time of the associated highlight; and creating the first digital media file from the plurality of third digital media files in accordance with the ordered sequence.

The present invention extends to a system, such as a computing device, and preferably a mobile computing device, for carrying out a method in accordance with any of the aspects or embodiments of the invention herein described.

Thus, in accordance with another aspect of the invention, there is provided a system for creating a first digital media file, comprising:

means for accessing one or more second digital media files, each second digital media file comprising video image data and highlight data identifying one or more times of interest in the video image data, said highlight data comprising one or more highlights each having a start time and end time with respective to the video image data;

means for selecting a plurality of highlights from the one or more second digital media files;

means for placing the selected highlights into an ordered sequence;

means for obtaining a third digital media file for each highlight in the ordered sequence, each third digital media file comprising video image data obtained from a second digital media file based on the start time and end time of the associated highlight; and means for creating the first digital media file from the plurality of third digital media files in accordance with the ordered sequence.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. Furthermore, preferably each highlight, in addition to a start time and end time (e.g. defined as an offset from the beginning of the video image data additionally comprises one or more of: an unique identifier; a type identifying the type of tag or highlight; a tag time identifying the time when the tag was generated; and additional information.

The one or more second media files can be stored in a memory of the computing device, or alternatively can be stored in a memory of the video camera and are accessed over a wireless connection. In these latter embodiments, the highlight data from the one or more second media files is preferably downloaded to a memory of the computing device (such that all the highlight data is present in a memory of the computing device).

In embodiments, the one or more media files, and the highlight associated therewith, may be accessed upon receipt of an input from the user on the computing device, which can be a mobile computing device such as a smartphone. The input from the user can be the selection of virtual button presented on the mobile computing device, or alternatively the input could be a predetermined movement of the computing device by the user, e.g. the shaking of the computing device.

In accordance with some aspects and embodiments of the invention, a plurality of highlights are selected from the one or more second media files. The selection of the highlights can be manual, e.g. through the user selecting individual highlights from a representation of the highlight data displayed on the computing device, such as in a manner as described above, but preferably the selection of the highlights occurs at least partially automatically. For example, highlights may be selected from the second media files that have most recently been recorded, and which have preferably been created within a predetermined time of the current time (since it is assumed that the user will typically want to create the first media file relatively soon after recording their activity or sport). In embodiments, these automatically selected highlights can be combined with one or more highlights that have been manually selected by the user. Alternatively, all of the highlights may be selected automatically. In embodiments, a plurality of highlights may be selected up to a predetermined number and/or such that the total duration of the selected highlights, i.e. the sum of the duration of each individual highlight, does not exceed a predetermined time value.

The selected highlights, whether selected manually, automatically or a combination thereof, are placed into an ordered sequence. The sequence may be ordered based on the creation data of the one or more second media files, such that the oldest recorded highlights are positioned first in the ordered sequence. Alternatively, the sequence may be based on information in the highlight data, or in sensor data, e.g. such that the highlights generated from more extreme moments are positioned first in the ordered sequence or possibly at periodic intervals in the sequence.

In embodiments, the computing device can display a representation of the selected highlights in the ordered sequence. The representation can include a thumbnail image, which is preferably a frame from the video image data contained in the respective media file for the time window defined by the respective highlight. The representation can also include information, preferably superimposed over the thumbnail image, identifying one or more of: the origin of the highlight, e.g. whether the highlight is a manual highlight or an automatic highlight; the type of automatic highlight; a value associated with the highlight, such as, for an automatic highlight, the value of an extremum that lead to the creation of the highlight; and a duration of the highlight.

Preferably, the user is able to select the representation of a highlight to play (or preview) the video image data corresponding to the highlight. Additionally, or alternatively, the user is able to: add new highlights, e.g. at any desired position in the ordered sequence; delete an existing selected highlight; and move an already existing selected highlight to another position in the ordered sequence. This allows, for example, the user to modify the highlights that are selected and/or to modify the position in the order of any highlights. Additionally, or alternatively, the user is able to change the start and/or end times of a selected highlight, e.g. by selecting the representation so as to play the highlight, and manipulating first and second indicators on a displayed timeline, wherein the first indicator is representative of the start time of the highlight and the second indicator is representative of the end time of the highlight. As will be appreciated, when the second media files are stored remotely from the computing device, e.g. in a memory of the video camera, any changes to the highlight data are sent to the video camera, such that the highlight data for the relevant second media file can be updated as required.

In embodiments, once a user is satisfied with the selected highlights and/or sequence order, a third media file is obtained for each highlight in the ordered sequence, wherein each third media file comprises video image data obtained from the second media file based on the start time and end time of the associated highlight. The third media files may be obtained by the computing device from the video camera, e.g. when the second media files are stored in a memory of the camera. Alternatively, in embodiments where the second media files are stored in a memory of the computing device, then the third media files can be obtained from the memory of the computing device. Preferably, however, a request is sent from the computing device to the video camera over a wireless communication channel.

Each third media files comprise video image data obtained from a second media file based on the start time and end time of the associated highlight. The third media files can comprise solely video image data, e.g. if requested by the user, such that they can add music to the first media file, or can comprise video image data and audio data. In either event, the third media files will typically be obtained by processing the relevant second media file in a transcoding operation. In other words, the payload portion of the second media file is demultiplexed, and then the relevant portion of the one or more resultant encoded streams (based on the start and end times of the highlight) are multiplexed and added to a new container, which is then closed to create the third media file. In embodiments, the transcoding operation, which preferably occurs on the video camera, can further include the decoding of at least the encoded video stream (preferably as stored in the video track of the file, and not the video image data in the text track of the file), and the subsequent re-encoding of the video image, such that all third media files have the same properties, preferably resolution and frame rate. This is allows, for example, for the first media file to be formed simply by the concatenation of the third media files ordered in accordance with the sequence, without the need to perform a further transcoding operation on the computing device.

It is believed that the creation of multiple highlight videos with the same properties is new and advantageous in its own right.

This, in accordance with another aspect of the present invention there is provided a method of creating a plurality of first digital media files from one or more second digital media files, each second digital media file comprising video image data and highlight data identifying one or more times of interest in the video image data, said highlight data comprising one or more highlights each having a start time and end time with respective to the video image data, the method comprising:

receiving a selection of a plurality of highlights from a computing device;

identifying, for each of the selected highlights, the one or more second digital media files comprising the video image data corresponding to the highlight;

transcoding at least the video image data from the each of the identified one or more second digital media files based on the start time and end time of the each of the selected highlights to create the plurality of first digital media files, wherein the transcoding is performed such that the plurality of first digital media files have the same properties; and transmitting the plurality of first digital media files to the computing device.

The present invention extends to a system, such as a digital video camera, for carrying out a method in accordance with any of the aspects or embodiments of the invention herein described.

Thus, in accordance with another aspect of the invention, there is provided a system for creating a plurality of first digital media files from one or more second digital media files, each second digital media file comprising video image data and highlight data identifying one or more times of interest in the video image data, said highlight data comprising one or more highlights each having a start time and end time with respective to the video image data, the method comprising:

means for receiving a selection of a plurality of highlights from a computing device;

means for identifying, for each of the selected highlights, the one or more second digital media files comprising the video image data corresponding to the highlight;

means for transcoding at least the video image data from the each of the identified one or more second digital media files based on the start time and end time of the each of the selected highlights to create the plurality of first digital media files, wherein the transcoding is performed such that the plurality of first digital media files have the same properties; and means for transmitting the plurality of first digital media files to the computing device.

As will be appreciated by those skilled in the art, these further aspects of the present invention can, and preferably do, include any one or more or all of the preferred and optional features of the invention described herein in respect of any of the other aspects of the invention, as appropriate. Accordingly, even if not explicitly stated, the system of the present invention may comprise means for carrying out any step described in relation to the method of the invention in any of its aspects or embodiments, and vice versa. For example, receipt of a selection of a plurality of highlights is preferably made by the computing device to the video camera over a wireless communication channel, and the plurality of first media files that are generated are preferably transmitted to the computing device from the video camera. The highlight data for the second media file is also preferably stored in a metadata portion of the file, whereas the video image data is stored in the payload portion of the file.

In embodiments, and as discussed above, the transcoding, i.e. at least demultiplexing and multiplexing streams, and optionally decoding and re-encoding of data, is performed such that the plurality of first digital media files have the same properties. The same properties can be the same video properties, e.g. at least the same resolution and frame rate, and/or the same audio proprieties.

Accordingly, in some aspects and embodiments of the invention, the computing device receives, or otherwise obtains, a plurality of third digital media files. These third digital media files correspond to the first digital media files mentioned above, and which have therefore preferably been created such that they each have the same properties, e.g. resolution, frame rate, etc.

This, in embodiments, the creation of the first digital media file from the plurality of third digital media files in accordance with the ordered sequence can comprise the concatenation of the plurality of third media files, e.g. since the video properties of each of the files is the same. In other embodiments, the user may decide to add music and/or a graphical overlay showing sensor data (e.g. as obtained from the sensor data in the metadata portion of the second media files, again based on the start and end times of the highlight). In these latter embodiments, the plurality of third digital media files undergo a further transcoding operation, albeit preferably in the computing device rather than the video camera, so as to create the first digital media file.

The first digital media file, once created, is preferably then uploaded by the user to a video sharing website, such as YouTube®, e.g. using a communication device of the computing device, such as WiFi or a mobile telecommunications transceiver. In other words, the first digital media file is preferably sent from the computing device to a remote server computer.

The method aspects and embodiments of the present invention as described herein are preferably computer implemented methods. The apparatus aspects and embodiments of the present invention can be configured to carry out any of all of the method steps as described herein, and vice-versa. It should be noted that the phrase "associated with" as used herein should not be interpreted to require any particular restriction on data storage locations. The phrase only requires that the features are identifiably related. Therefore association may for example be achieved by means of a reference to a file, potentially located in a remote server.

The present invention can be implemented in any suitable system, such as a suitably configured micro-processor based system. In a preferred embodiment, the present invention is implemented in a computer and/or micro-processor based system. The present invention is particularly, but not exclusively, suitable for use in low power and portable devices. Thus, in a preferred embodiment, the computing device comprises a portable device, such as a mobile telephone or PDA. The present invention is applicable to any suitable form or configuration of video camera.

The present invention accordingly also extends to a video camera and/or a video camera system, that includes the system or apparatus of the present invention, e.g. a computing device, and preferably a mobile computing device.

The various functions of the present invention can be carried out in any desired and suitable manner. For example, the functions of the present invention can be implemented in hardware or software, as desired. Thus, for example, unless otherwise indicated, the various functional elements and "means" of the invention may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the present invention may be duplicated and/or carried out in parallel on a given processor. Equally, the various processing stages may share processing circuitry, etc., if desired.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software, e.g. computer programs. It will thus be seen that when viewed from further aspects the present invention provides computer software specifically adapted to carry out the methods herein described when installed on one or more data processors, a computer program element comprising computer software code portions for performing the methods herein described when the program element is run on one or more data processors, and a computer program comprising code adapted to perform all the steps of a method or of the methods herein described when the program is run on a data processing system. The one or more data processors may be a microprocessor system, a programmable FPGA (field programmable gate array), etc.

The invention also extends to a computer software carrier comprising such software which when used to operate a video camera system comprising one or more data processors causes in conjunction with said one or more data processors said system to carry out the steps of the methods of the present invention. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 18A to 18F show how highlight clips can be manipulated by a user to create a movie;

DETAILED DESCRIPTION OF THE PREFERRED EMBODIMENTS

A number of preferred embodiments of the present invention will now be described. The preferred embodiments relate to a video camera system, in which video image data and contemporaneous sensor data is recorded and processed.

Figure 4:
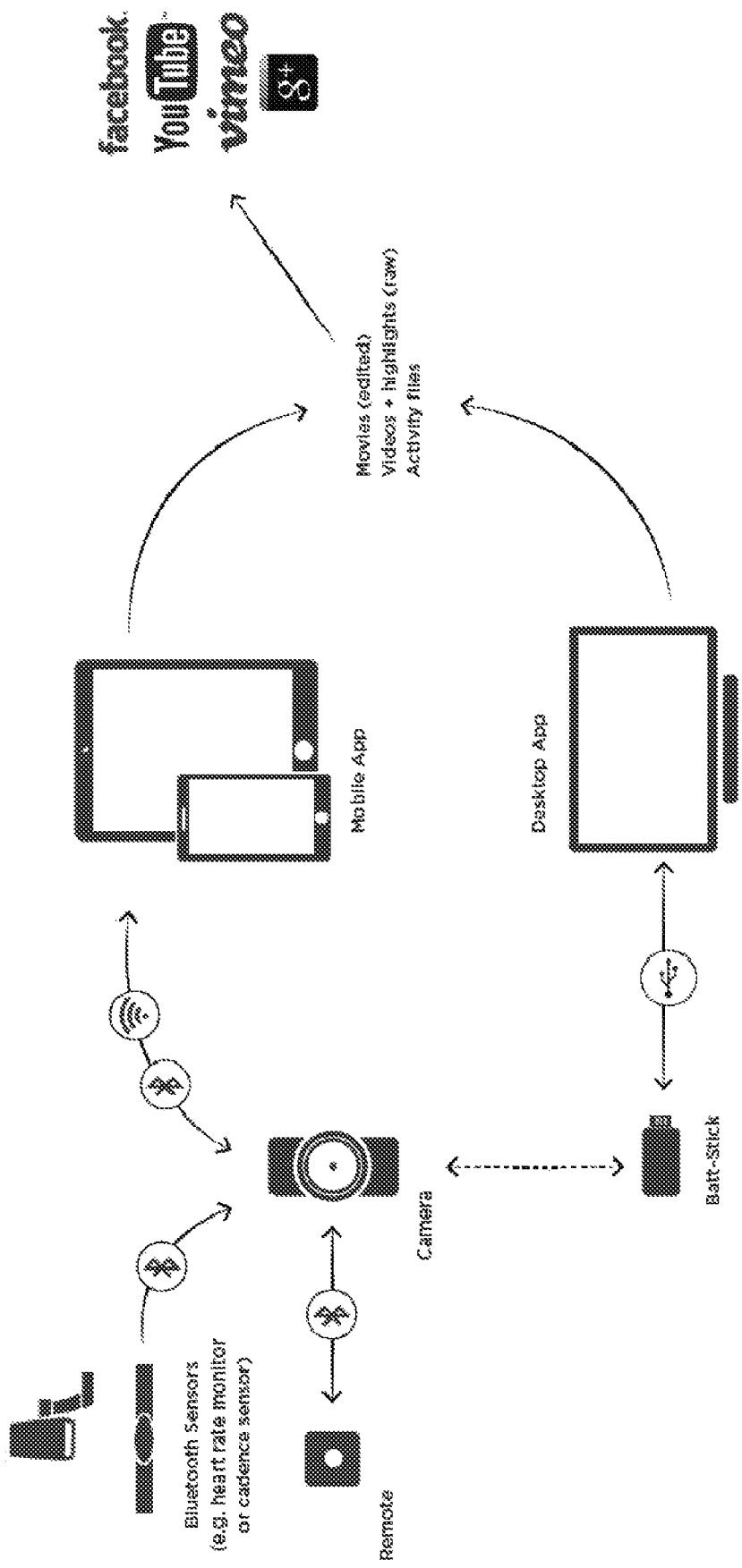
FIG. 4 shows a schematic depiction of a video camera system in accordance with an embodiment of the invention.
Figure 5:
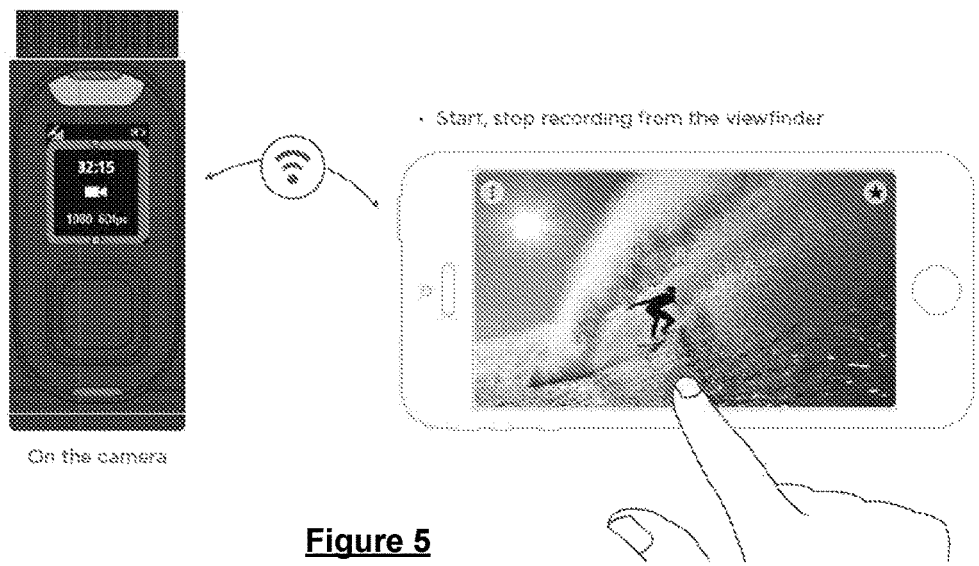
FIG. 5 shows an exemplary method of starting and stopping recording from a viewfinder of a mobile device.

FIG. 4 shows schematically a video camera system in accordance with the present embodiment. The video camera system of the present embodiment comprises a video camera having a number of inbuilt sensors including a GPS device, an electronic compass, a barometer, a 3D accelerometer and a gyroscope. In various other embodiments, the video camera may comprise more or less inbuilt sensors, as described herein. The video camera of the present embodiment also comprises a WiFi interface and a Bluetooth interface. The video camera system of the present embodiment also comprises additional sensors, including a heart rate monitor and/or a cadence monitor that can wirelessly communicate with the video camera via the Bluetooth interface. In another embodiment, the video camera system may comprise a watch (e.g. smart watch) having one or more sensors that can wirelessly communication with the video camera. The video camera is also arranged to be wirelessly connectable to an application ("app") running on a mobile computing device; the app can be used to control functions of the camera, play (or preview) videos, etc.

Figure 2:
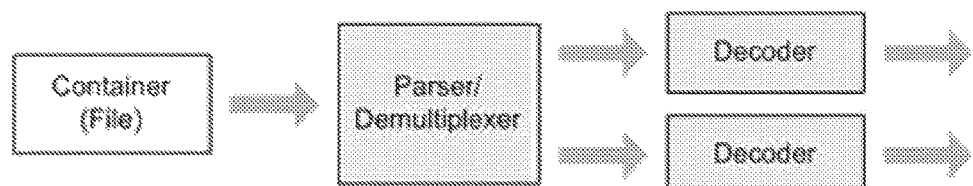
FIG. 2 shows a technique for reading a digital media file known as "decoding"
Figure 3:
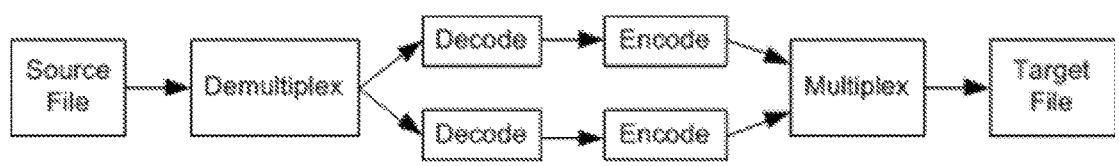
FIG. 3 shows a technique known as "transcoding"

As illustrated by FIG. 2, the application can operate as a viewfinder for the video camera and allows control of the video camera (e.g. start, stop recording, zoom, other settings, etc.). The application can also be used for playback of recorded data from the camera, post-processing/editing of the data, and for the creation of and sharing of edited movies made from the recorded data. Thus, in the present embodiment, a user can operate the video camera, edit and share videos "on-the-go" using the mobile computing device, without ever having to connect to the desktop computer.

In use, the video camera system operates to record video image data, audio data and contemporaneous sensor data from one or more of the sensors. The recorded data is then stored in a detachable memory device ("Batt-Stick") of the video camera.

The recorded data is processed by the video camera and/or the external mobile computing device or desktop computing devices, so as to post-process the data, before the post-processed data is stored in the memory device and/or uploaded to the internet.

Figure 1:
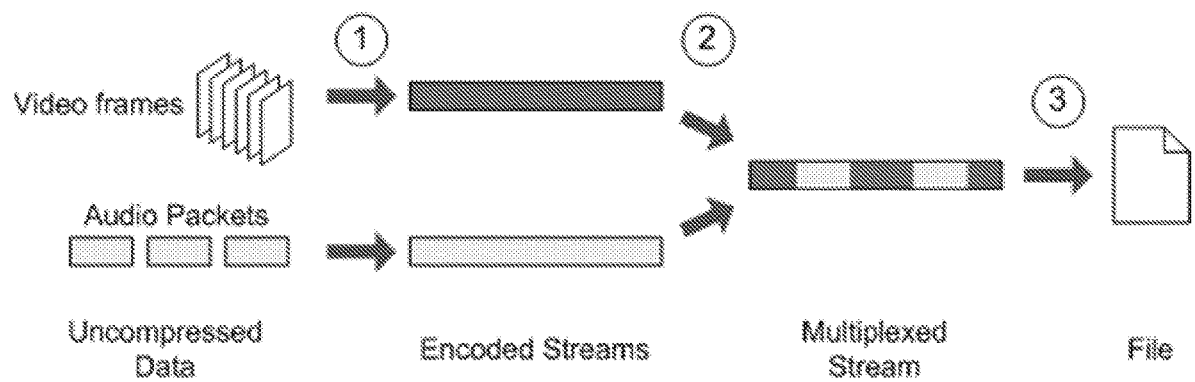
FIG. 1 shows a technique for writing a digital media file known as "encoding"

Although not shown in FIG. 1, in an embodiment, multiple video cameras may be connected to a single computing device.

Figure 6:
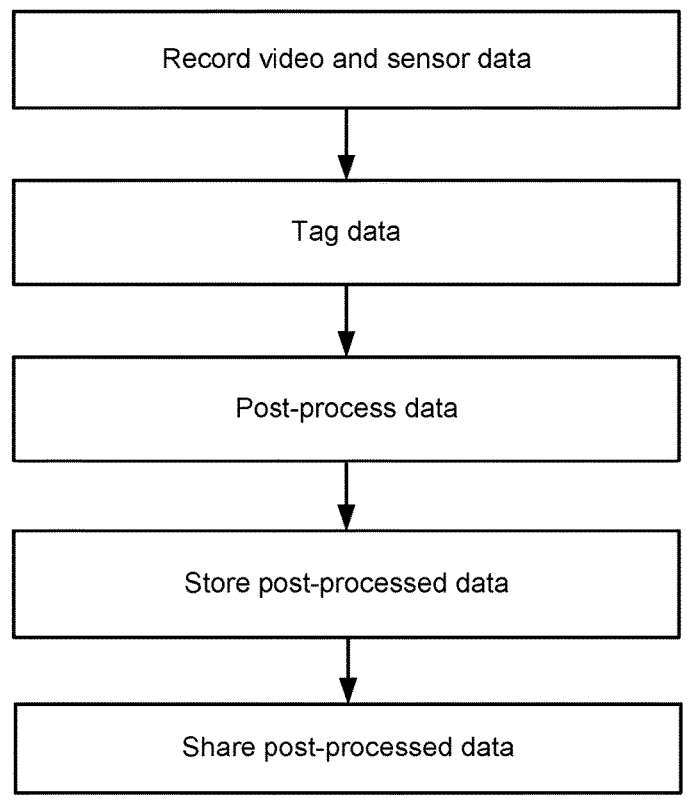
FIG. 6 shows schematically the steps for processing the data in accordance with an embodiment of the invention.
Figure 7:
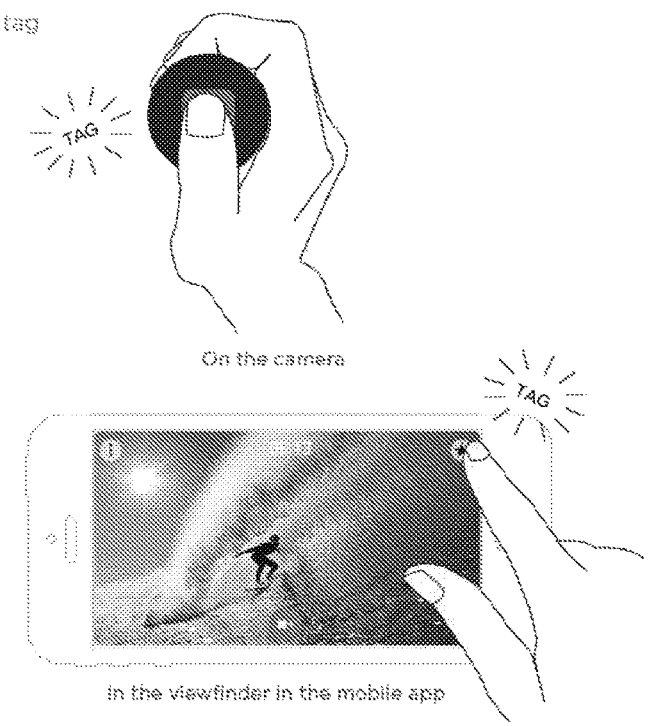
FIG. 7 show examples of generating manual tags.

FIG. 6 shows schematically in more detail the steps for processing the data in accordance with the present embodiment. As discussed above, video image data, audio data and contemporaneous sensor data is recorded by the video camera. The recorded video image data is "tagged" with one or more tags. In the present embodiment, "tagging" is the manual or automatic placement of a marker in the metadata of the recording. Tags can be used to quickly identify moments of interest within the video image data. One or more tags can be manually added by a user during recording of the data, i.e. during the recorded activity, by performing an action at the appropriate time (i.e. when something interesting happens). As illustrated by FIG. 7, this may be done by a user pressing a (physical or virtual) button on the video camera and/or a (second) user pressing a button on the mobile device. In another embodiment, one or more tags can be manually added by a (second) user pressing a button on a remote control that is wirelessly connected with the video camera.

One or more tags may be automatically added after the data has been recorded, i.e. the video camera system and/or computing device can place automatic tags which require no user input. Automatic tags can be generated "on-the-fly" (i.e. during recording of the data), but may also be generated at a later time, for example if the amount of data that needs to be processed is relatively high.

One or more tags can be automatically added on the basis of the video image data. For example, tags may be generated for portions of the video image data where the video image data comprises one or more faces (e.g. using face recognition technology), and/or where the video image data indicates that the lens of the video camera has been covered for a certain period of time (e.g. based on the light levels in the video image data).

Figure 8:
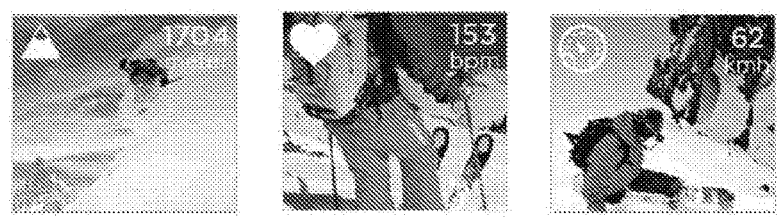
FIG. 8 show examples of where tags have been generated automatically based on sensor data.

One or more tags can be automatically added on the basis of the contemporaneous sensor data. For example, one or more tags can be added where the contemporaneous sensor data comprises an "extreme" value or an "extreme" change in value. For example, as shown in FIG. 8, tags can be generated for portions of the video image data where the sensor data indicates a maximum in altitude, heart rate or speed.

Tags can be generated for portions of the video image data where the sensor data indicates a maximum speed (e.g. based on GPS data), maximum heart rate (e.g. based on heart rate sensor data), maximum cadence (e.g. based on cadence sensor data), maximum acceleration (e.g. based on accelerometer data), maximum impact G-force (e.g. based on accelerometer data), maximum sustained G-force (e.g. based on accelerometer data), maximum barometer reading, maximum vertical speed (e.g. based on accelerometer data), maximum jump time/airtime (e.g. based on barometer data), a certain degree of rotation such as 360 degrees (e.g. based on accelerometer data), a crash or fall (e.g. based on accelerometer data), the start/stop of physical activity/movement (e.g. based on GPS and/or accelerometer data), maximum volume (e.g. based on audio data), a particular voice or word (e.g. someone's name) (e.g. based on analysis, e.g. voice recognition, of the audio data), and/or a certain (e.g. popular) location (e.g. based on GPS data).

Figure 14:
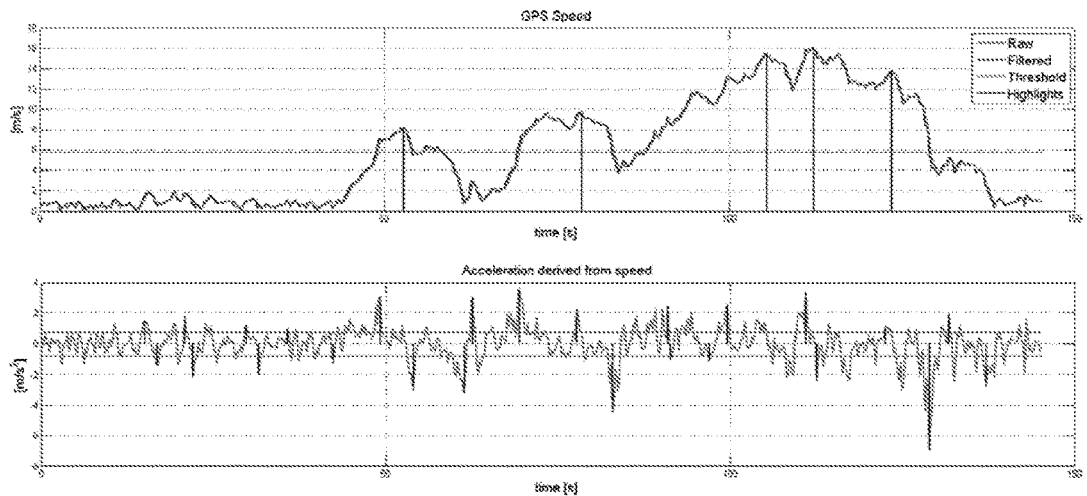
FIGS. 14 to 17 show an exemplary method used to automatically generated tags.
Figure 15:
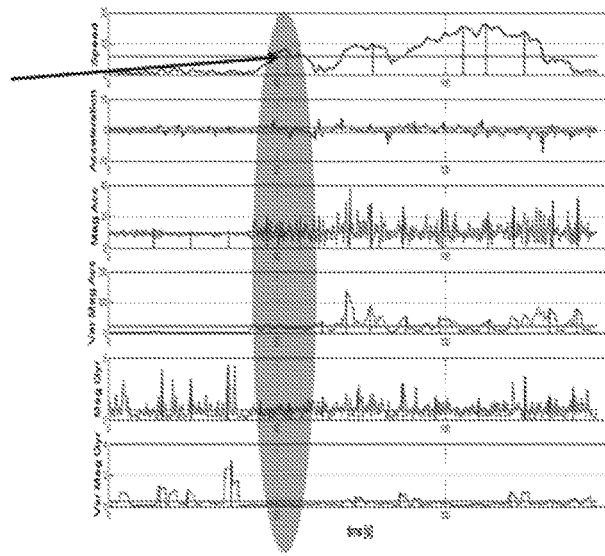
Figures 16, 17:
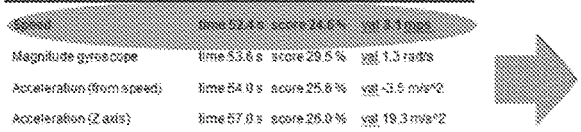

FIGS. 14 to 17 show an exemplary method used to automatically generated tags, or in this case highlights (since a time period is marked, rather than just a single point in time). FIG. 14 shows exemplary datasets for variables determined from sensor data, wherein the peaks have been identified and marked as 'highlights'. FIG. 15 shows how a score is derived for an individual highlight. FIG. 16 illustrates the clustering of individual highlights. Finally, FIG. 17 shows that that clusters of highlights are sorted and ranked, with the higher scoring clusters being used to generate the tags.

One or more tags may be generated based upon criteria derives using data analysis of manual tagging performed by plural other users. Suggested tags can be presented to a user, e.g. based on combinations of sensor data that are used by other users to tag moments.

One or more additional tags may be manually added during playback of the recorded data by a user pressing a button or making a selection, e.g. using the computing device. Thus, a user can manually add "missing" tags.

The data is then post-processed using the tags.

In the present embodiment, this involves translating the one or more tags into "highlights". "Highlights" are clips of video image data derived from individual tags. For example, a highlight may comprise the preceding 5 seconds of video image data and the following 5 seconds of video image relative to the time associated with the tag. Other time periods would, of course, be possible. Highlight clips can then be used to give users a quick and effortless overview of the most interesting moments in the recordings they made.

A given recording may comprise multiple highlights and/or different types of highlights, i.e. depending on the number of tags added to the video image data and/or depending on the types of tags (i.e. depending on what it was that caused the tag to be generated).

Figure 9:
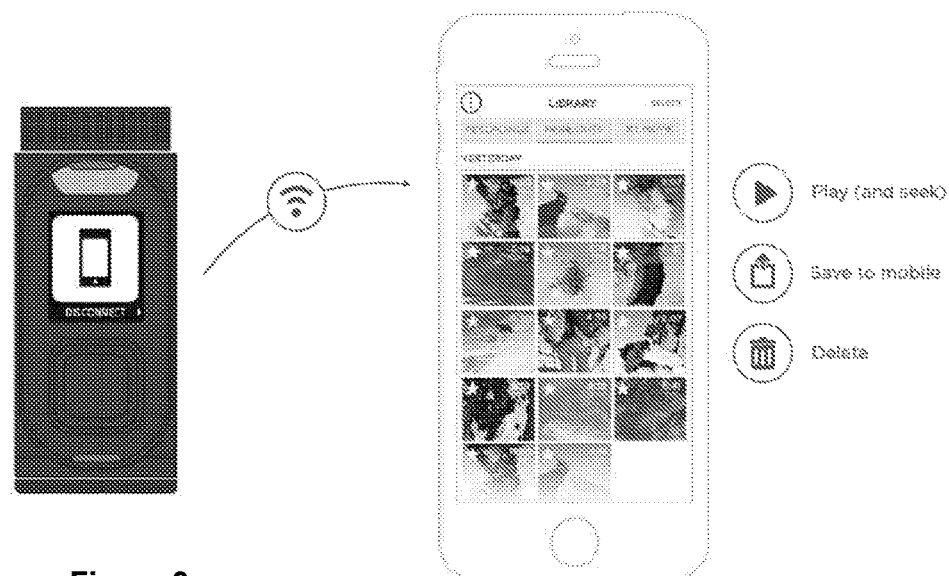
FIG. 9 shows how videos and highlights can be streamed from the camera to a mobile device.

As illustrated in FIG. 9, the highlight clips are generated by the video camera and wirelessly streamed to the mobile device. Alternatively, the highlight clips can be transferred to the desktop computer. Alternatively, the computing device can generate the highlight clips itself after receiving the "raw" data from the video camera.

The highlight clips are presented to the user on the computing device, e.g. in the form of a "Highlight Wall" for selection. The "raw" recordings can also be displayed to the user.

The highlight clips or the raw data can then be further edited by the user.

Figure 10:
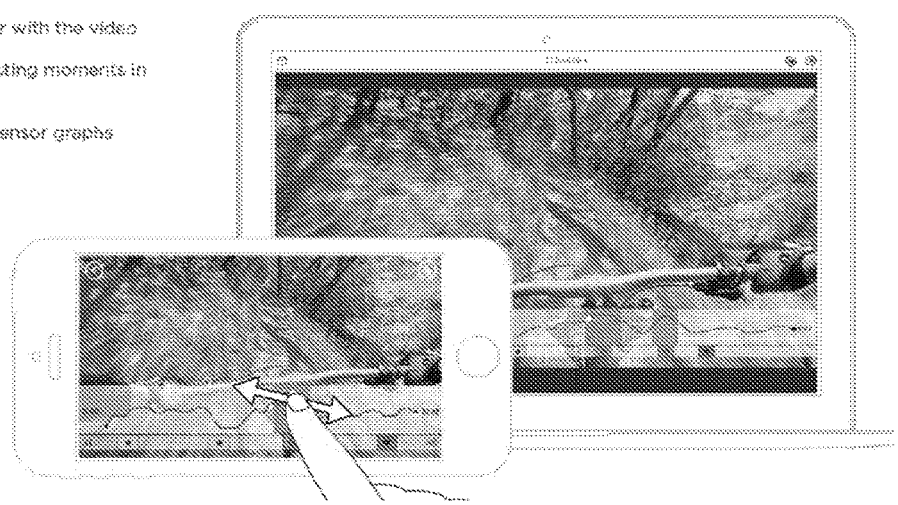
FIG. 10 shows how sensor graphs can be used as a video scrubber.
Figure 11:
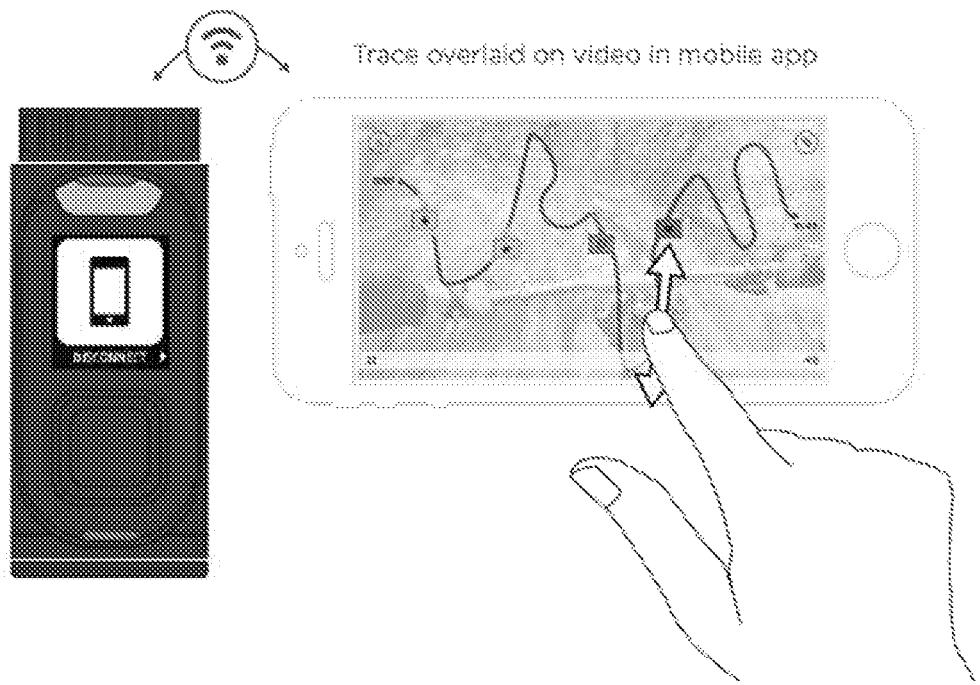
FIG. 11 shows how a GPS trace can be used as a video scrubber.
Figure 12:
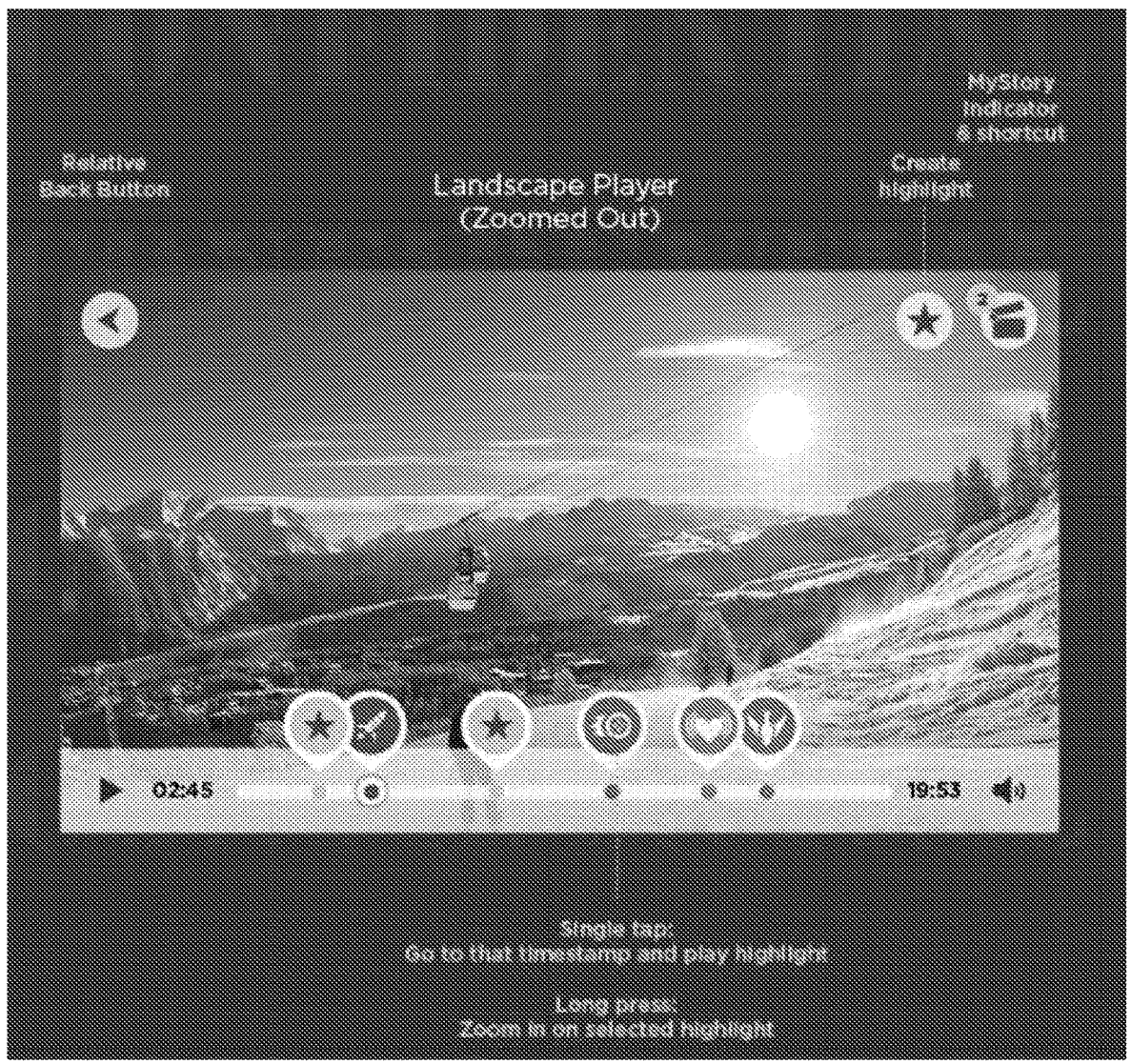
FIG. 12 shows a set of highlights depicted on a timeline.
Figure 12:
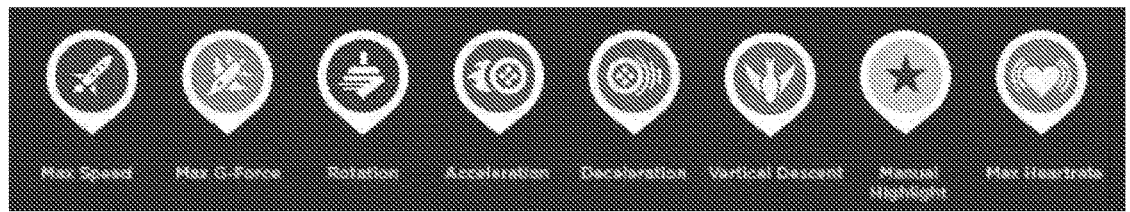

FIGS. 10 to 12 illustrates a number of modes of operation that a user can use to scrub and edit the clips. These modes can assist a user in selecting the best highlights, e.g. for sharing, etc.

In "timeline view", as shown in FIG. 12, the tags are depicted in chronological order along a timeline together with the video image data. The tags are depicted by icons which are representative of the type of tag (e.g. which sensor they are related to, etc.). The location of the corresponding highlight clips is also shown along a video image data timeline. Selection of one of the tags or the timeline causes the video playback to skip to the corresponding portion of video image data.

In "graph view", as shown in FIG. 10, the tags are again depicted in chronological order along a timeline together with the video image data. However, a representation of the data from one or more of the sensors is additionally or alternatively displayed (i.e. instead of the video image data timeline) as a function of time. Selection of a portion of the timeline causes the video playback to skip to the corresponding portion of video image data. This then allows the user to select playback of portions of the video image data based on the sensor data.

In "trace view", as shown in FIG. 11, a map is displayed showing position data collected during recording of the video data. The tags are each displayed at their appropriate positions on the map.

Figure 13:
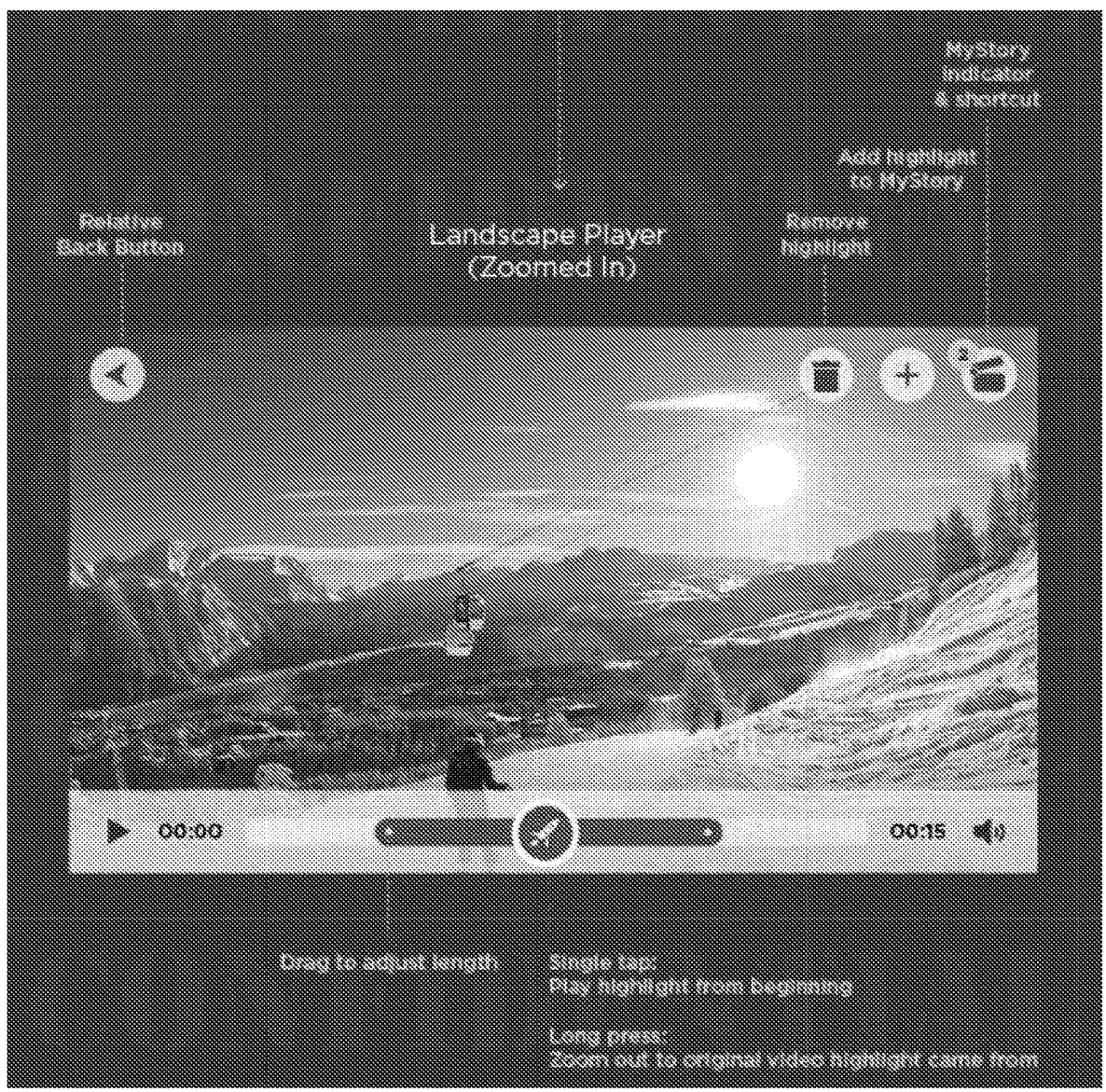
FIG. 13 shows an example result of selecting a highlight from the timeline of FIG. 12.

The user can select and view highlights as desired. The user can further edit (e.g. trim, etc.) each of the highlights, if desired. This is shown, for example, in FIG. 13, which in this exemplary case is reached from the "timeline view" of FIG. 12.

The highlight clips can then be manipulated by a user to create a "movie", e.g. comprising several highlight clips. One or more visual effects, music, etc., can be added to the raw data files, highlight clips, and/or edited movies using the mobile device. One or more parts of the sensor data may be incorporated into a post-processed video file. This is shown in FIGS. 18A to 18F. FIG. 18C, in particular, shows that highlights can be retrieved and automatically placed in a certain order for use in the generation of a "story" (of the user's latest exploits). The user is able to add, delete and reorder highlights using the screen of FIG. 18C.

Figure 19:
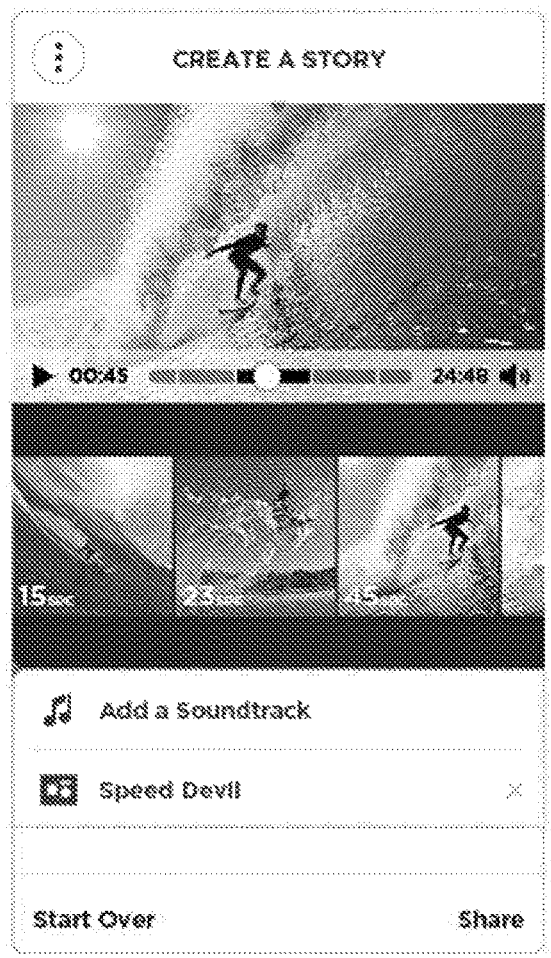
FIG. 19 shows an exemplary screen where the movie formed from the various highlights can be viewed by a user, at the same time as the user being able to manipulate the highlights.

FIG. 19 shows an exemplary screen where the movie formed from the various highlights can be viewed by a user, at the same time as the user being able to manipulate the highlights, e.g. by adding highlights, deleting highlights and reordering highlights, The timeline of the movie is shown divided into a plurality of segments, each segment relating to a different highlight. An icon is shown on the timeline indicating the position within the movie currently being displayed. The relevant segment of the timeline is also shown differently from the other segments, such that the user can easily see which highlight is currently being viewed, and the relative length of the highlight in comparison to the other highlights forming the movie and the full movie itself.

Figure 20:
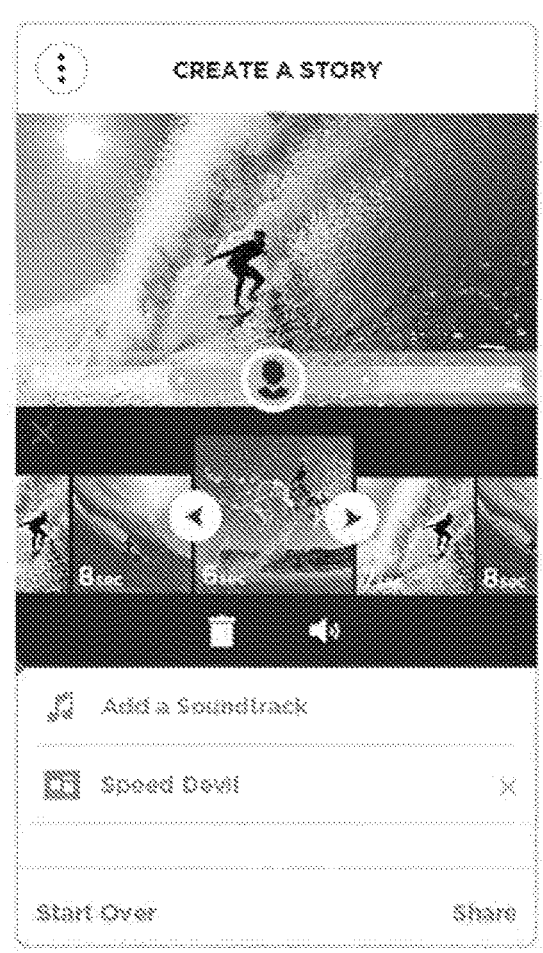
FIG. 20 shows another exemplary screen where the currently selected highlight can be viewed by the user, while also allowing the user to change the start and end times of the highlight.
Figure 21:
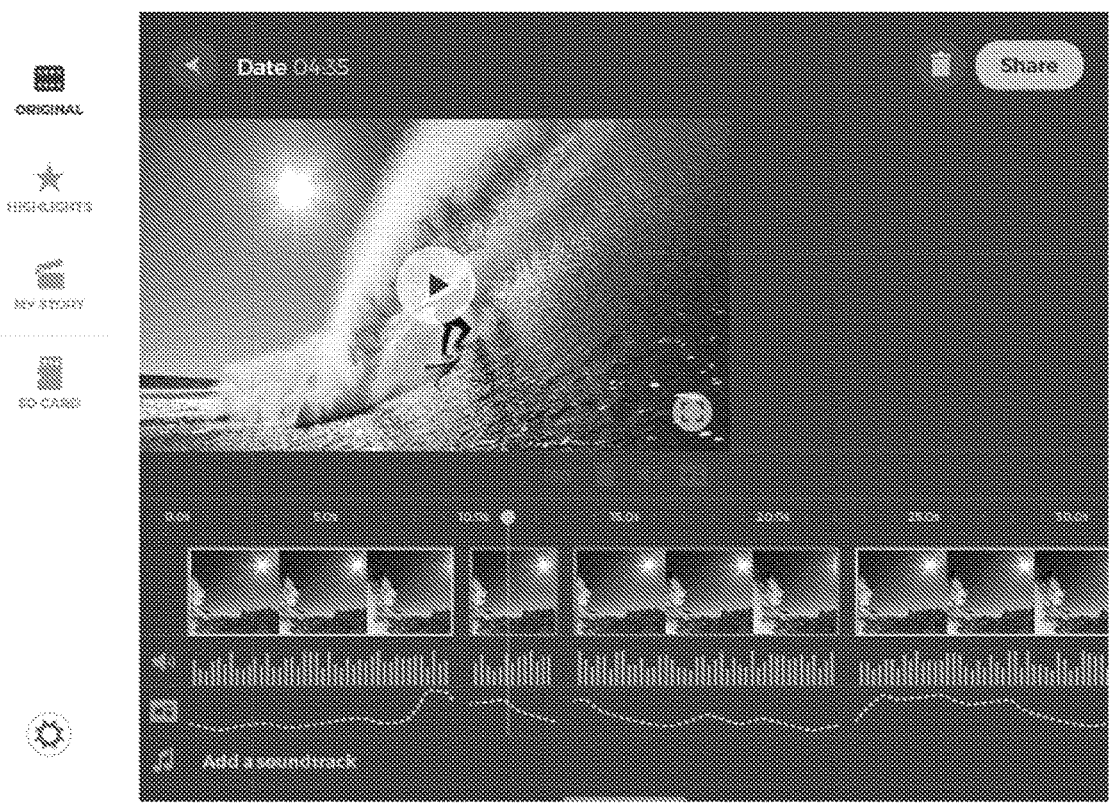
FIGS. 21 to 24 illustrate a method to allow a user to use and edit highlights to create a movie comprising a plurality of highlights.
Figure 23:
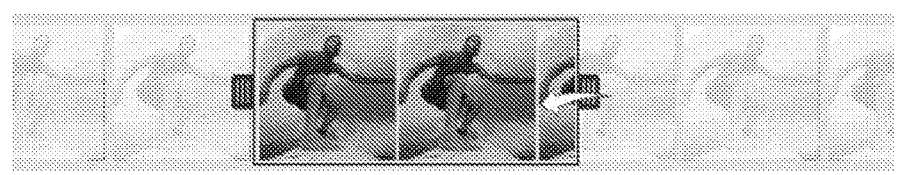
Figure 22:
Figure 24:
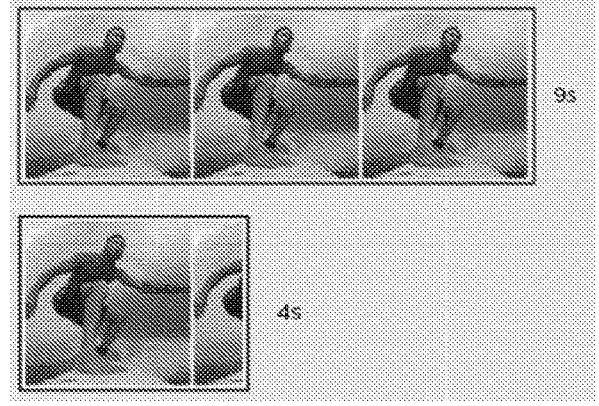

FIG. 20, meanwhile, shows another exemplary screen where the currently selected highlight can be viewed by the user, while also allowing the user to change the start and end times of the highlight, e.g. in a similar manner to that described above in relation to FIG. 13. FIGS. 21 to 24 illustrate another method to allow a user to use and edit highlights to create a movie comprising a plurality of highlights. In particular, FIG. 21 shows an overview of all the highlights in the movie, together with any added "effects", such as muted audio, added overlays and/or a soundtrack. The user can select, e.g. click, a single highlight to perform certain actions associated with that highlight, and in so doing make changes to the movie. The overview includes a vertical line indicating the current position in the movie relative to a horizontal timeline, together with a series of thumbnails showing the individual highlights that make up the movie, each highlight being shown relative to the timeline, such that the user can see the start and end times of each highlight. Under the row with the highlights are three additional rows: the top row includes a series of bar graphs showing the recorded audio levels for each highlight; the middle row includes a series of traces showing the variation in certain sensor data, e.g. speed, acceleration, elevation, heart rate, etc, for each highlight; and the bottom row includes information about any soundtracks that are desired to be played with a highlight or with the move as a whole. When a highlight is selected, e.g. as represented by the image of FIG. 22, the highlight can be deleted, repositioned relative to the other highlights and/or the start time and/or end time of the highlight can be adjusted (e.g. as shown in FIG. 23). Due to the nature of the overview, the display of the audio and sensor data is updated simultaneously with any adjustments to a highlight, such that a user can easily see whether the adjustments are desirable. As shown by FIG. 24, the number of thumbnail images shown for a highlight varies with the length of the highlight, such that the number of thumbnail images can also be used by a user as an indicator of the length of the highlight.

Figure 25:
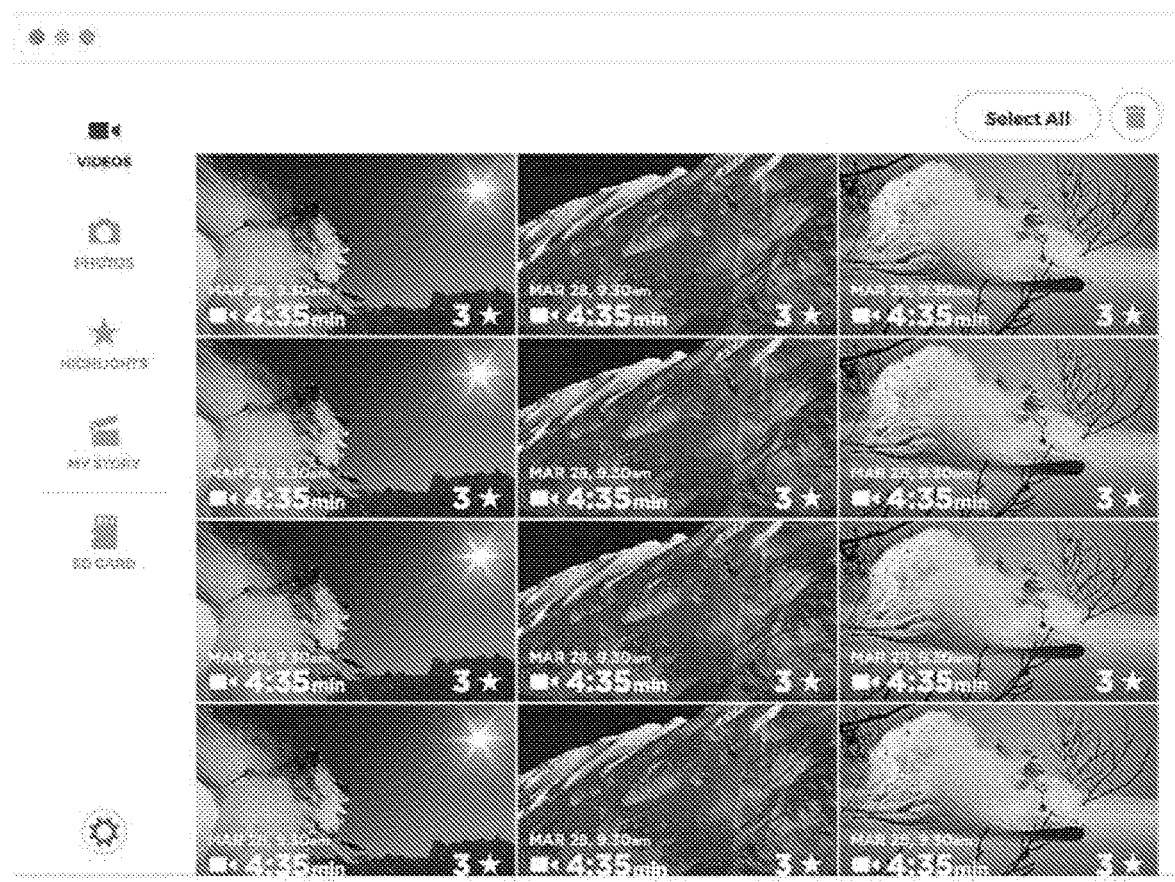
FIG. 25 shows an example of a thumbnail grid that can be used to display to a user the various videos, highlights and/or edited movies (or "stories")

FIG. 25 shows an example of a thumbnail grid that can be used to display to a user the various videos, highlights and/or edited movies (or "stories") stored in a memory, e.g. of a computing device, of the camera, or a removable memory card. Each media file is represented by a thumbnail image, which typically corresponds to a predetermined frame from the relevant video image data. Additional information concerning the file is also superimposed over thumbnail image, such the location of the file (in this case the camera icon indicates the file is location in a memory of the camera), the length of the video image data, and the date and time at which the video image data was created. Each of the thumbnail images can be selected by the user, e.g. by a touch when using a touchscreen or by using a computer mouse, to allow the associated video, highlight and/or story to be moved to a different memory, to be deleted from a memory, to be viewed, etc.

Figure 26:
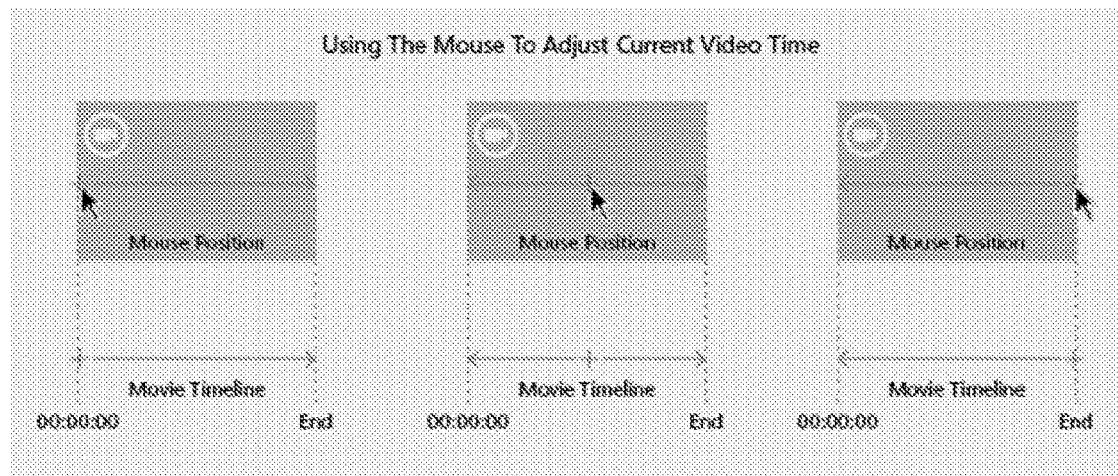
FIGS. 26 and 27 illustrate a technique for previewing the video image data associated with a thumbnail image by moving a cursor of a mouse across the thumbnail image.
Figure 27:
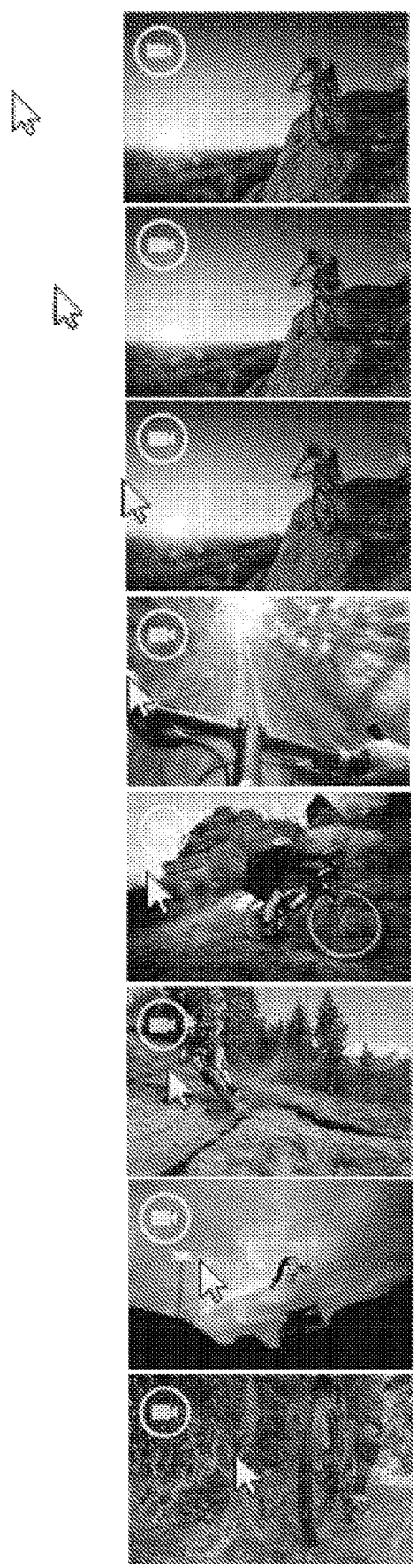

FIGS. 26 and 27 illustrate a technique for previewing the video image data associated with a thumbnail image by moving a cursor of a mouse across the thumbnail image. As shown in FIG. 26, a timeline is defined across the thumbnail image, such that the left side of the thumbnail represents the start of the video image data and the right side represents the end of the video image data. The timeline is used to divide the area of the image into a series of vertical slices, wherein each slice is represented by a different frame of the video image data. Therefore, as the cursor is moved horizontally the thumbnail image is changed to an image based on the frame of the video image data corresponding to the vertical slice in which the cursor is currently located. Due to the way in which the area is divided, in this example, a vertical movement of the cursor has no effect on the thumbnail image being displayed. Similarly, when the cursor is not moved, then the thumbnail image remains the same; either based on the frame associated with the vertical slice in which the cursor is located, or if the cursor is not yet positioned over the thumbnail image, then the displayed image is based on a frame from the video image data at a predetermined time from the beginning of the video. FIG. 27 shows an exemplary series of thumbnail images that would be shown as the cursor is moved across the thumbnail.

The final post-processed/edited movie is stored. The movie can be stored in the desktop computer's memory. In "on-the-go" contexts, the movie can be transferred to and stored on the camera's SD card, which will typically have much more capacity than the mobile device. In an alternative embodiment, editing indications are transferred from the mobile device to the camera, which then performs the appropriate transcoding, and stores the final movie on the SD card. This reduces the required memory bandwidth.

The post-processed/edited data can then be presented to the user of the mobile device for selection.

The data can be shared. The user can select one or more raw data files, highlight clips, edited movies, and export the files, either for downloading to the mobile device or to an external web server, email, etc.

Figure 28:
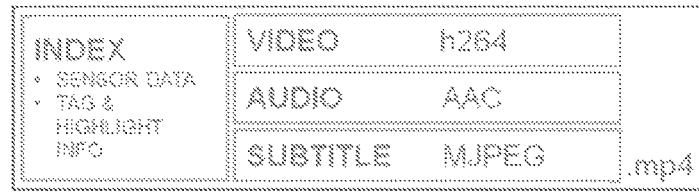
FIG. 28 shows a data structure of an MP4 media file in which the data collected by the video camera is stored in the memory of the video camera.

FIG. 28 shows a data structure of an MP4 media file in which the data collected by the video camera is stored in the memory of the video camera. The media file comprises a metadata portion denoted as an index of the media file, and a payload portion. The metadata portion comprises at least file type information, codec information, one or more descriptions of the payload data, and user information. The metadata portion also comprises sensor data and the tags. This means that the sensor data and the tags can be conveniently accessed and manipulated, without having to read and/or de-multiplex the payload data. For example, additional tags can be added to the media file, and tags can be deleted from the media file conveniently by appropriately modifying the metadata. The metadata also comprises information that indicates the position of the media file in a sequence of related media files. This can be useful when the collected data will not fit in the video camera's internal buffer, so that it is necessary to record the data across a sequence of media files. The information can be used to identify the sequence of media files when playing back the data, such that the sequence of media files can be automatically played back in order, without a user having to manually select all of the media files that make up the sequence. The payload portion comprises a multiplexed video image track, audio track and subtitle track. The video image data is stored in the video image track, the audio data is stored in the audio track, and a low resolution version of the video image data is stored in the subtitle track. In embodiments described herein where video data is transferred to the mobile device, the low resolution version of the video image data is transferred rather than the original version. This can save memory bandwidth and power, and is desirable where the mobile computing device is not able to display the full resolution version of the data.

Figure 29:
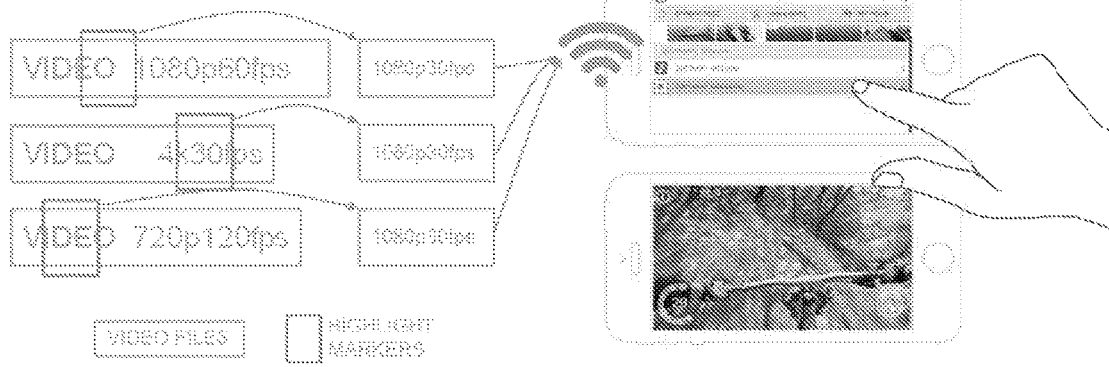
FIG. 29 shows how high definition videos can be created using a combination of the video processing capabilities on the camera and the mobile computing device.

FIG. 29 shows how high definition videos can be created using a combination of the video processing capabilities on the camera and the mobile computing device. In particular, a selection of highlights can be received from the mobile computing device, and the camera transcodes highlights from any resolution into a common resolution, e.g. 1080p or 720p. These highlight videos (based on the high definition video data, rather than the low definition video data in the subtitle track) are then transmitted to the mobile computing device, where the videos are stitched together, and optionally have audio added and/or are overlaid with sensor data.

It will be appreciated that whilst various aspects and embodiments of the present invention have been described, the scope of the present invention is not limited to the described embodiments. The skilled person will acknowledge the following aspects.

A method of storing data may be providing, the data being collected by a digital video camera having one or more sensor devices associated therewith, the method including receiving an first input to cause the camera to start recording, opening a digital media container on a first memory based on receipt of the first input, writing video image data based on data received from an image sensor of the camera to a payload portion of the digital media container, storing sensor data based on data received from the one or more sensor devices in a second memory, receiving a second input to cause the camera to stop recording, adding the sensor data stored in the second memory to a metadata portion of the digital media container based on receipt of the second input, and closing the digital media container to create a digital media file stored in the first memory.

The first input and/or second input may be a manual input by a user, such as the user actuating a user input of the camera or a remote control device operatively connected to the camera.

The first input and/or second input may automatically be generated based on data from the one or more of the sensor devices.

The camera may include a video processing device, and the video image data may include an encoded video stream generated using an encoder of the video processing device from the data received from the image sensor.

The first memory may be different from the second memory. The first memory may be a memory removable from the camera, and the second memory may be a non-removable memory within the camera.

The one or more sensor devices measure at least one of: movements or other physical parameters of the camera, user of the camera and/or item of sports equipment and/or vehicle to which the camera is mounted, environmental conditions around the user and/or camera, and physiological properties of the user.

The sensor data received from the one or more sensor devices is optionally stored in the second memory in association with data indicative of a time at which the data was determined by the sensor data.

The sensor data may be contemporaneous with the video image data, such that the sensor data includes data collected from the one or more sensor devices during the time in which the video image data is recorded.

The method may include, when opening the digital media container on the first memory, reserving a predetermined amount of memory before the payload portion of the container into which the metadata portion of the container is added when closing the container to create the media file.

The method may include storing highlight data identifying one or more times of interest in the video image data in the second memory, and adding the highlight data stored in the second memory to the metadata portion of the digital media container based on receipt of the second input.

A method of storing data identifying one or more times of interest in video image data collected by a digital video camera, the method including: receiving an first input to cause the camera to start recording, opening a digital media container on a first memory based on receipt of the first input, writing video image data based on data received from an image sensor of the camera to a payload portion of the digital media container, storing highlight data identifying one or more times of interest in the video image data in a second memory, adding the highlight data stored in the second memory to a metadata portion of the digital media container based on receipt of a second input to cause the camera to stop recording, and closing the digital media container to create a digital media file stored in the first memory.

The highlight data may include one or more highlights, each highlight being a time period in the video image data.

The time period of a highlight may include a time window based on a time of a tag, the tag being a single time in the video image data.

The time of the tag for a highlight may be determined based on received data indicative of a manual input by a user, such as the user actuating a user input of the camera or a remote control device operatively connected to the camera.

The time of the tag for a highlight may be automatically determined based on an analysis of the sensor device received from the one or more sensor devices.

The analysis of the sensor data may be performed after receipt of the second input to cause the camera to stop recording, so as to generate the highlight data, and the sensor data and the highlight data may be added to the metadata portion of the digital media container.

The camera may be associated with a plurality of sensor devices, and the analysis of the sensor data may include analysing a plurality of datasets from the plurality of sensor devices. Each of the datasets optionally includes a plurality of data values for a plurality of times during a time period in which the video image data is collected.

The analysis of the datasets may include: identifying extrema in each of the plurality of datasets, determining, for each of the identified extrema, if the time of an extremum is within a predetermined time of the time of another of the extrema, and generating a plurality of clusters based on the determination, each cluster including a plurality of extrema, wherein the time of each extremum in the cluster is within the predetermined time of the time of another extremum in the cluster.

According to an aspect there may be provided a method of identifying one or more times of interest in video image data collected by a digital video camera during a time period, the digital video camera having a plurality of sensor devices associated therewith, the method including identifying extrema in each of a plurality of datasets obtained from the plurality of sensor devices, each dataset including a plurality of data values for a plurality of times during the time period, determining, for each of the identified extrema, if the time of an extremum is within a predetermined time of the time of another of the extrema, generating a plurality of clusters based on the determination, each cluster including a plurality of extrema, wherein the time of each extremum in the cluster is within the predetermined time of the time of another extremum in the cluster, using at least one of the clusters to create highlight data identifying one or more times of interest in the video image data, the highlight data including at least one highlight having a time window based on the earliest and latest of the times of the extrema in the cluster used to create the highlight, and storing the highlight data in association with a digital media file including the video image data.

Each cluster optionally has a start time and an end time, which together define a duration for the cluster. The time window for a highlight created from a cluster is based on the duration for the cluster.

According to an aspect, there may be provided a method of storing data collected by a digital video camera having an image sensor and a video processing device. The method may include: receiving an first input to cause the camera to start recording, opening a digital media container on a memory based on receipt of the first input, using a first encoder of the video processing device to generate a first encoded video stream from data received from the image sensor using an interframe compression technique, using a second encoder of the video processing device to generate a second encoded video stream from the data received from the image sensor using an intraframe compression technique, writing the first and second encoded video streams to a payload portion of the digital media container, receiving a second input to cause the camera to stop recording, and closing the digital media container to create a digital media file stored in the memory based on receipt of the second input.

The first encoded stream may be written to a video track of the payload portion of the container. The data may be added to a metadata portion of the container such that the first encoded video stream is identified as video image data in the digital media file.

The second encoded stream is optionally written to a text track, such as a subtitle track, of the payload portion of the container, such that the second encoded video stream is not identified as video image data in the digital media file.

According to yet a further aspect, there is provided a method of storing data collected by a digital video camera having an image sensor and a video processing device, the method including receiving an first input to cause the camera to start recording, opening a digital media container on a memory based on receipt of the first input, the digital media container including at least a video track and a text track, using the video processing device to generate a first encoded video stream and a second encoded video stream from data received from the image sensor, writing the first encoded video stream to the video track of the digital media container and writing the second encoded video stream to the text track of the digital media container, receiving a second input to cause the camera to stop recording, and closing the digital media container to create a digital media file stored in the memory based on receipt of the second input.

Alternatively or additionally a method is provided of identifying one or more times of interest in video image data collected by a digital video camera during a time period, the digital video camera having a position determining device associated therewith, the method including: accessing a digital media file including the video image data and first position data, the first position data being representative of the change in position of the digital video camera during the time period, transmitting the first position data to a server, receiving second position data from the server, the second position data identifying one or more positions of interest in the first position data, and adding highlight data to the digital media file, the highlight data identifying one or more times of interest in the video image data corresponding to at least some of the one or more positions of interest in the second position data.

A method of transmitting data from a digital video camera to a remote computing device may be provided. The video camera may have: a first wireless communication device capable of communicating using a first communication protocol with a remote computing device; and a second wireless communication device capable of communicating using a second communication protocol with the remote computing device, the method including: receiving, at the first wireless communications device from the computing device, a first command to activate the second wireless communication device from the computing device, activating the second wireless communication device and establishing a connection between the camera and the computing device using the second wireless communication device based on receipt of the first command, receiving, at the second wireless communication device over the established connection from the computing device, a request for at least one of: video image data received from an image sensor of the camera; and data from one or more media files stored in a memory of the video camera, transferring the requested data from the video camera to the computing device over the established connection using the second wireless communication device, receiving, at the first wireless communications device from the computing device, a second command to deactivate the second wireless communication device from the computing device, and deactivating the second wireless communication device based on receipt of the second command.

According to yet a further aspect, there is provided a method of reviewing video image data collected by a digital video camera during a time period using a computing device, the digital video camera having one or more sensor devices associated therewith, the method including: accessing a digital media file including the video image data and sensor data, the sensor data being based on data received from the one or more sensor devices during the time period, displaying the video image data in a first display window on a display device of the computing device, and simultaneously displaying a timeline in a second display window on the display device, together with an icon having a location relative to the timeline to show the video image data currently being displayed in the first display window, and wherein the timeline includes a representation of the sensor data, receiving an input from a user on an input device of the computing device to change the location of the icon relative to the timeline, and changing the video image data being displayed in the first display window to correspond to the changed location of the icon relative to the timeline.

There may, according to a further aspect, be provided a method of reviewing video image data collected by a digital video camera using a computing device, the method including accessing a digital media file including the video image data and highlight data identifying one or more times of interest in the video image data, the highlight data including at least one highlight having a start time and end time with respect to the video image data that together define a time window, displaying the video image data in a first display window on a display device of the computing device, simultaneously displaying a timeline in a second display window on the display device, together with one or more selectable markers, each selectable marker being associated with a highlight and having a location relative to the timeline corresponding to a time within the time window of the highlight, receiving a selection of a marker from a user on an input device of the computing device, and changing the video image data being displayed in the first display window to correspond to the video image data for a time based on the time window of the highlight associated with the selected marker.

A method may be provided, the method including accessing one or more second media files, each second media file including video image data and highlight data identifying one or more times of interest in the video image data, the highlight data including one or more highlights each having a start time and end time with respect to the video image data, selecting a plurality of highlights from the one or more second media files, placing the selected highlights into an ordered sequence, obtaining a third media file for each highlight in the ordered sequence, each third media file including video image data obtained from a second media file based on the start time and end time of the associated highlight, and creating the first media file from the plurality of third media files in accordance with the ordered sequence.

A further method may be provided. The method may be a method of creating a plurality of first digital media files from one or more second digital media files, each second digital media file including video image data and highlight data identifying one or more times of interest in the video image data, the highlight data including one or more highlights each having a start time and end time with respective to the video image data, the method including: receiving a selection of a plurality of highlights from a computing device, identifying, for each of the selected highlights, the one or more second digital media files including the video image data corresponding to the highlight, transcoding at least the video image data from the each of the identified one or more second digital media files based on the start time and end time of the each of the selected highlights to create the plurality of first digital media files, wherein the transcoding is performed such that the plurality of first digital media files have the same properties, and transmitting the plurality of first digital media files to the computing device.

According to an aspect, a method may be provided, the method being a method of previewing video image data using a computing device, the method including accessing a digital media file including the video image data, displaying a thumbnail image representative of the digital media file in a display window on a display device of the computing device, defining a timeline extending from a first position on a boundary of the thumbnail image to a second position on the boundary of the thumbnail image, such that the first position represents a start time of the video image data and the second position represents an end time of the video image data, and using the timeline to divide at least a portion of a first area defined by the boundary into a plurality of second areas, such that each of the second areas is representative of a different time period between the start time and the end time, selecting a frame from the video image data based on the time period associated with the second area in which a pointer of a pointing device is located, and using the selected frame to generate a new thumbnail image for display in the display window, such that the movement of the pointer from one second area to another causes a change in the displayed thumbnail image.

According to an aspect a system is provided, the system being a system for storing data collected by a digital video camera having one or more sensor devices associated therewith. The system includes one or more processing resources configured to: receive a first input to cause the camera to start recording, open a digital media container on a first memory based on receipt of the first input, write video image data based on data received from an image sensor of the camera to a payload portion of the digital media container, store sensor data based on data received from the one or more sensor devices in a second memory, receive a second input to cause the camera to stop recording, add the sensor data stored in the second memory to a metadata portion of the digital media container based on receipt of the second input, and close the digital media container to create a digital media file stored in the first memory.

According to a further aspect there is provided a system for storing data identifying one or more times of interest in video image data collected by a digital video camera, the system including one or more processing resources configured to: receive a first input to cause the camera to start recording, open a digital media container on a first memory based on receipt of the first input, write video image data based on data received from an image sensor of the camera to a payload portion of the digital media container, store highlight data identifying one or more times of interest in the video image data in a second memory, add the highlight data stored in the second memory to a metadata portion of the digital media container based on receipt of a second input to cause the camera to stop recording, and close the digital media container to create a digital media file stored in the first memory.

Yet a further aspect may provide a system for identifying one or more times of interest in video image data collected by a digital video camera during a time period, the digital video camera having a plurality of sensor devices associated therewith, the system including one or more processing resources configured to: identify extrema in each of a plurality of datasets obtained from the plurality of sensor devices, each dataset including a plurality of data values for a plurality of times during the time period, determine, for each of the identified extrema, if the time of an extremum is within a predetermined time of the time of another of the extrema, generate a plurality of clusters based on the determination, each cluster including a plurality of extrema, wherein the time of each extremum in the cluster is within the predetermined time of the time of another extremum in the cluster, use at least one of the clusters to create highlight data identifying one or more times of interest in the video image data, the highlight data including at least one highlight having a time window based on the earliest and latest of the times of the extrema in the cluster used to create the highlight, and store the highlight data in association with a digital media file including the video image data.

According to a further aspect a system for storing data collected by a digital video camera is provided, the system having an image sensor and a video processing device, the system including one or more processing resources configured to: receive a first input to cause the camera to start recording, open a digital media container on a memory based on receipt of the first input, use a first encoder of the video processing device to generate a first encoded video stream from data received from the image sensor using an interframe compression technique, use a second encoder of the video processing device to generate a second encoded video stream from the data received from the image sensor using an intraframe compression technique, write the first and second encoded video streams to a payload portion of the digital media container, receive a second input to cause the camera to stop recording, and close the digital media container to create a digital media file stored in the memory based on receipt of the second input.

According to yet again a further aspect, there is provided a system for storing data collected by a digital video camera having an image sensor and a video processing device, the system including one or more processing resources configured to: receive a first input to cause the camera to start recording, open a digital media container on a memory based on receipt of the first input, the digital media container including at least a video track and a text track, use the video processing device to generate a first encoded video stream and a second encoded video stream from data received from the image sensor, write the first encoded video stream to the video track of the digital media container and writing-the second encoded video stream to the text track of the digital media container, receive a second input to cause the camera to stop recording, and close the digital media container to create a digital media file stored in the memory based on receipt of the second input.

Alternatively of additionally, a system may be provided for identifying one or more times of interest in video image data collected by a digital video camera during a time period, the digital video camera having a position determining device associated therewith, the system including one or more processing resources configured to: access a digital media file including the video image data and first position data, the first position data being representative of the change in position of the digital video camera during the time period, transmit the first position data to a server, receive second position data from the server, the second position data identifying one or more positions of interest in the first position data, and add highlight data to the digital media file, the highlight data identifying one or more times of interest in the video image data corresponding to at least some of the one or more positions of interest in the second position data.

According to yet another aspect, a system is provided for transmitting data from a digital video camera to a remote computing device, the video camera having: a first wireless communication device capable of communicating using a first communication protocol with a remote computing device; and a second wireless communication device capable of communicating using a second communication protocol with the remote computing device, the system including one or more processing resources configured to:

receive, at the first wireless communications device from the computing device, a first command to activate the second wireless communication device from the computing device;

activate the second wireless communication device and establish a connection between the camera and the computing device using the second wireless communication device based on receipt of the first command;

receive, at the second wireless communication device over the established connection from the computing device, a request for at least one of: video image data received from an image sensor of the camera; and data from one or more media files stored in a memory of the video camera;

transfer the requested data from the video camera to the computing device over the established connection using the second wireless communication device;

receive, at the first wireless communications device from the computing device, a second command to deactivate the second wireless communication device from the computing device; and deactivate the second wireless communication device based on receipt of the second command.

Another aspect has been provided, the aspect relating to a system for reviewing video image data collected by a digital video camera during a time period using a computing device, the digital video camera having one or more sensor devices associated therewith, the system including one or more processing resources configured to: access a digital media file including the video image data and sensor data, the sensor data being based on data received from the one or more sensor devices during the time period, display the video image data in a first display window on a display device of the computing device, and simultaneously display a timeline in a second display window on the display device, together with an icon having a location relative to the timeline to show the video image data currently being displayed in the first display window, and wherein the timeline includes a representation of the sensor data, receive an input from a user on an input device of the computing device to change the location of the icon relative to the timeline, and change the video image data being displayed in the first display window to correspond to the changed location of the icon relative to the timeline.

According to another aspect, a system may be provided, the system being a system for reviewing video image data collected by a digital video camera using a computing device, the system including one or more processing resources configured to: access a digital media file including the video image data and highlight data identifying one or more times of interest in the video image data, the highlight data including at least one highlight having a start time and end time with respective to the video image data that together define a time window, display the video image data in a first display window on a display device of the computing device, simultaneously display a timeline in a second display window on the display device, together with one or more selectable markers, each selectable marker being associated with a highlight and having a location relative to the timeline corresponding to a time within the time window of the highlight, receive a selection of a marker from a user on an input device of the computing device, and change the video image data being displayed in the first display window to correspond to the video image data for a time based on the time window of the highlight associated with the selected marker.

According to a further aspect, a system is provided for creating a first digital media file, the system including one or more processing resources configured to: access one or more second digital media files, each second digital media file including video image data and highlight data identifying one or more times of interest in the video image data, the highlight data including one or more highlights each having a start time and end time with respective to the video image data, select a plurality of highlights from the one or more second digital media files, place the selected highlights into an ordered sequence, obtain a third digital media file for each highlight in the ordered sequence, each third digital media file including video image data obtained from a second digital media file based on the start time and end time of the associated highlight, and create the first digital media file from the plurality of third digital media files in accordance with the ordered sequence.

According to yet a further aspect, a system is provided, the system being a system for creating a plurality of first digital media files from one or more second digital media files, each second digital media file including video image data and highlight data identifying one or more times of interest in the video image data, the highlight data including one or more highlights each having a start time and end time with respective to the video image data, the system including one or more processing resources configured to: receive a selection of a plurality of highlights from a computing device, identify, for each of the selected highlights, the one or more second digital media files including the video image data corresponding to the highlight, transcode at least the video image data from the each of the identified one or more second digital media files based on the start time and end time of the each of the selected highlights to create the plurality of first digital media files, wherein the transcoding is performed such that the plurality of first digital media files have the same properties, and transmit the plurality of first digital media files to the computing device.

According to yet another aspect, a system is provided which is a system for previewing video image data using a computing device, the system including one or more processing resources configured to: access a digital media file including the video image data, display a thumbnail image representative of the digital media file in a display window on a display device of the computing device, define a timeline extending from a first position on a boundary of the thumbnail image to a second position on the boundary of the thumbnail image, such that the first position represents a start time of the video image data and the second position represents an end time of the video image data, and use the timeline to divide at least a portion of a first area defined by the boundary into a plurality of second areas, such that each of the second areas is representative of a different time period between the start time and the end time, select a frame from the video image data based on the time period associated with the second area in which a pointer of a pointing device is located, and use the selected frame to generate a new thumbnail image for display in the display window, such that the movement of the pointer from one second area to another causes a change in the displayed thumbnail image.

According to an aspect non-transitory computer readable medium is provided, the medium including a set of instructions that, when executed by one or more processors of a digital video camera, cause the digital video camera to perform a method as described above.

The invention claimed is:

1. A method of storing data collected by a digital video camera having one or more sensor devices associated therewith, the method comprising:

receiving an first input to cause the camera to start recording;

opening a digital media container on a first memory based on receipt of the first input, the opening including reserving a predetermined amount of memory before a payload portion of the digital media container into which a metadata portion of the container is to be added when closing the container to create the media file;

writing video image data based on data received from an image sensor of the camera to the payload portion of the digital media container;

storing sensor data based on data received from the one or more sensor devices in a second memory, wherein the second memory is not used for storing video image data;

upon receiving a second input, causing the camera to stop recording;

after the camera has stopped recording, acquiring, from the second memory, the sensor data and incorporating the sensor data into a metadata portion in the predetermined amount of memory that was previously reserved before the payload portion of the digital media container on the first memory; and closing the digital media container to create a digital media file stored in the first memory.

2. The method of claim 1, wherein the first input and/or second input is a manual input by a user, such as the user actuating a user input of the camera or a remote control device operatively connected to the camera.

3. The method of claim 1, wherein the first input and/or second input is automatically generated based on data from the one or more of the sensor devices.

4. The method of claim 1, wherein the camera comprises a video processing device, and the video image data comprises an encoded video stream generated using an encoder of the video processing device from the data received from the image sensor.

5. The method of claim 1, wherein the first memory is different from the second memory, said first memory being a memory removable from the camera, and said second memory being a non-removable memory within the camera.

6. The method of claim 1, wherein the one or more sensor devices measure at least one of:
   (i) movements or other physical parameters of the camera, user of the camera and/or item of sports equipment and/or vehicle to which the camera is mounted;
   (ii) environmental conditions around the user and/or camera; and
   (iii) physiological properties of the user.

7. The method of claim 1, wherein the sensor data received from the one or more sensor devices is stored in the second memory in association with data indicative of a time at which the data was determined by the sensor data.

8. The method of claim 1, wherein the sensor data is contemporaneous with the video image data, such that the sensor data comprises data collected from the one or more sensor devices during the time in which the video image data is recorded.

9. The method of claim 1, further comprising:
   storing highlight data identifying one or more times of interest in the video image data in the second memory; and
   adding the highlight data stored in the second memory to the metadata portion of the digital media container based on receipt of the second input.

10. The method of claim 9, wherein the highlight data comprises one or more highlights, each highlight being a time period in the video image data.

11. The method of claim 10, wherein the time period of a highlight comprises a time window based on a time of a tag, said tag being a single time in the video image data.

12. The method of claim 11, wherein the time of the tag for a highlight is determined based on received data indicative of a manual input by a user, such as the user actuating a user input of the camera or a remote control device operatively connected to the camera.

13. The method of claim 11, wherein the time of the tag for a highlight is automatically determined based on an analysis of the sensor device received from the one or more sensor devices.

14. The method of claim 13, wherein the analysis of the sensor data is performed after receipt of the second input to cause the camera to stop recording, so as to generate the highlight data, and the sensor data and the highlight data are added to the metadata portion of the digital media container.

15. The method of claim 13, wherein the camera is associated with a plurality of sensor devices, and wherein the analysis of the sensor data comprises analysing a plurality of datasets from the plurality of sensor devices, each of the datasets comprises a plurality of data values for a plurality of times during a time period in which the video image data is collected.

16. The method of claim 15, wherein the analysis of the datasets comprises:
identifying extrema in each of the plurality of datasets;
determining, for each of the identified extrema, if the time of an extremum is within a predetermined time of the time of another of the extrema; and
generating a plurality of clusters based on the determination, each cluster comprising a plurality of extrema, wherein the time of each extremum in the cluster is within the predetermined time of the time of another extremum in the cluster.

17. The method of claim 16, wherein each cluster has a start time and an end time, which together define a duration for the cluster, and wherein the time window for a highlight created from a cluster is based on the duration for the cluster.

18. The method of claim 1, further comprising:
determining, based on one or more characteristics of the video image data to be written in the payload portion of the digital media container, a size of the predetermined amount of memory.

19. The method of claim 18, wherein the characteristics of the video image data include a format of the video image data.

20. A system for storing data collected by a digital video camera having one or more sensor devices associated therewith, the system comprising one or more processing resources configured to:
receive a first input to cause the camera to start recording;
open a digital media container on a first memory based on receipt of the first input, the opening including reserving a predetermined amount of memory before a payload portion of the digital media container into which a metadata portion of the container is to be added when closing the container to create the media file;
write video image data based on data received from an image sensor of the camera to the payload portion of the digital media container;
store sensor data based on data received from the one or more sensor devices in a second memory, wherein the second memory is not used for storing video image data;
upon receiving a second input, causing the camera to stop recording;
after the camera has stopped recording, acquiring, from the second memory, the sensor data and incorporating the sensor data into a metadata portion in the predetermined amount of memory that was previously reserved before the payload portion of the digital media container on the first memory; and
close the digital media container to create a digital media file stored in the first memory.

21. A non-transitory computer readable medium comprising computer software comprising a set of instructions that, when executed by one or more processors of a digital video camera, cause the digital video camera to perform a method of storing data collected by a digital video camera having one or more sensor devices associated therewith, the method comprising:
receiving an first input to cause the camera to start recording;
opening a digital media container on a first memory based on receipt of the first input, the opening including reserving a predetermined amount of memory before a payload portion of the digital media container into which a metadata portion of the container is to be added when closing the container to create the media file;
writing video image data based on data received from an image sensor of the camera to the payload portion of the digital media container;
storing sensor data based on data received from the one or more sensor devices in a second memory, wherein the second memory is not used for storing video image data;
upon receiving a second input, causing the camera to stop recording;
after the camera has stopped recording, acquiring, from the second memory, the sensor data and incorporating the sensor data into a metadata portion in the predetermined amount of memory that was previously reserved before the payload portion of the digital media container on the first memory; and
closing the digital media container to create a digital media file stored in the first memory.

* * * * *